(12) United States Patent
Fukuhara et al.

(10) Patent No.: US 8,422,553 B2
(45) Date of Patent: Apr. 16, 2013

(54) INFORMATION PROCESSING DEVICE AND METHOD

(75) Inventors: Takahiro Fukuhara, Kanagawa (JP); Katsutoshi Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 948 days.

(21) Appl. No.: 12/307,447

(22) PCT Filed: May 16, 2008

(86) PCT No.: PCT/JP2008/059003
§ 371 (c)(1),
(2), (4) Date: Jan. 5, 2009

(87) PCT Pub. No.: WO2008/143158
PCT Pub. Date: Nov. 27, 2008

(65) Prior Publication Data
US 2009/0316779 A1    Dec. 24, 2009

(30) Foreign Application Priority Data

May 17, 2007  (JP) ................................ 2007-132156
Feb. 4, 2008   (JP) ................................ 2008-024401

(51) Int. Cl.
*H04N 7/12* (2006.01)
(52) U.S. Cl.
USPC ............ 375/240.02; 375/240.03; 375/240.11; 375/240.19; 375/240.24; 382/243; 370/477

(58) Field of Classification Search ................... 375/704, 375/240.01–240.25; 370/477; 382/243
See application file for complete search history.

(56) References Cited

U.S. PATENT DOCUMENTS

| 5,454,079 | A | 9/1995 | Roper et al. |
| 6,188,700 | B1* | 2/2001 | Kato et al. ................ 370/477 |
| 6,697,531 | B2* | 2/2004 | Yamaguchi et al. ........ 382/243 |
| 6,707,948 | B1 | 3/2004 | Cosman et al. |
| 7,120,306 | B2 | 10/2006 | Okada et al. |

(Continued)

FOREIGN PATENT DOCUMENTS

| EP | 0 860 966 A2 | 8/1998 |
| JP | 2000-358183 | 12/2000 |

(Continued)

OTHER PUBLICATIONS

European Search Report issued Nov. 3, 2010 in PCT/JP2008059003.

(Continued)

*Primary Examiner* — Christopher Brown
*Assistant Examiner* — Fahimeh Mohammadi
(74) *Attorney, Agent, or Firm* — Oblon, Spivak, McClelland, Maier & Neustadt, L.L.P.

(57) ABSTRACT

The present invention relates to an information processing apparatus and method which make it possible to transmit image data with high quality and low delay in more versatile situations. A control unit 111 obtains negotiation information including a transmission-allowed bit rate of a transmission line 103, which is defined in a standard, information regarding a receiving apparatus, or a measured value of the transmission-allowed bit rate, controls whether or not to encode image data and transmit the encoded image data, and performs settings in encoding, such as a resolution, a bit rate, and a delay time. Also, an encoding unit 113 controls a decomposition number of a chrominance component in accordance with the format of image data to be encoded. The present invention is applicable to, for example, a communication apparatus.

9 Claims, 24 Drawing Sheets

U.S. PATENT DOCUMENTS

| | | | |
|---|---|---|---|
| 7,486,735 B2 * | 2/2009 | Dubuc et al. | 375/260 |
| 2001/0008546 A1 | 7/2001 | Fukui et al. | |
| 2003/0039398 A1 | 2/2003 | McIntyre | |
| 2003/0152280 A1 | 8/2003 | Kadowaki et al. | |
| 2003/0179943 A1 | 9/2003 | Okada et al. | |
| 2003/0202581 A1 * | 10/2003 | Kodama | 375/240.03 |
| 2004/0095509 A1 | 5/2004 | Okamoto et al. | |
| 2005/0025233 A1 | 2/2005 | Metz et al. | |
| 2005/0188407 A1 | 8/2005 | van Beek et al. | |
| 2006/0013300 A1 * | 1/2006 | Han | 375/240.03 |
| 2006/0195464 A1 | 8/2006 | Guo | |
| 2007/0071091 A1 * | 3/2007 | Lay et al. | 375/240.2 |
| 2007/0223582 A1 * | 9/2007 | Borer | 375/240.12 |
| 2008/0259799 A1 * | 10/2008 | van Beek | 370/235 |
| 2009/0060081 A1 * | 3/2009 | Zhang et al. | 375/267 |
| 2011/0206286 A1 * | 8/2011 | Taketa et al. | 382/232 |

FOREIGN PATENT DOCUMENTS

| | | |
|---|---|---|
| JP | 2001 275112 | 10/2001 |
| JP | 2001-275112 | 10/2001 |
| JP | 2003 101791 | 4/2003 |
| JP | 2003-101791 | 4/2003 |
| JP | 2003-116133 | 4/2003 |
| JP | 2003 116133 | 4/2003 |
| JP | 2003-274185 | 9/2003 |
| JP | 2003 274185 | 9/2003 |
| JP | 2004-166096 | 6/2004 |
| JP | 2005-142673 | 6/2005 |
| JP | 2005 303854 | 10/2005 |
| WO | 2007 058294 | 5/2007 |
| WO | 2007 058296 | 5/2007 |
| WO | WO 2007/050740 A2 | 5/2007 |

OTHER PUBLICATIONS

Pamela Cosman, et al., "Memory Constrained Wavelet Based Image Coding", IEEE Signal Processing Letters, vol. 5, No. 9, XP011060058, Sep. 1, 1998, pp. 221-223.

Jens-Rainer Ohm, "Multimedia Framework MPEG-21", Multimedia Communication Technology, Section 17.7, XP-002603291, Jan. 1, 2004, pp. 797-800.

Japanese Office Action issued May 12, 2011, in Patent Application No. 2008-289346.

Japanese Office Action issued May 19, 2011, in Patent Application No. 2008-289345.

U.S. Appl. No. 12/374,509, filed Jan. 21, 2009, Fukuhara, et al.

* cited by examiner

SPLITTING LEVEL = 3
(H: HIGH FREQUENCY, L: LOW FREQUENCY)

FIG. 4
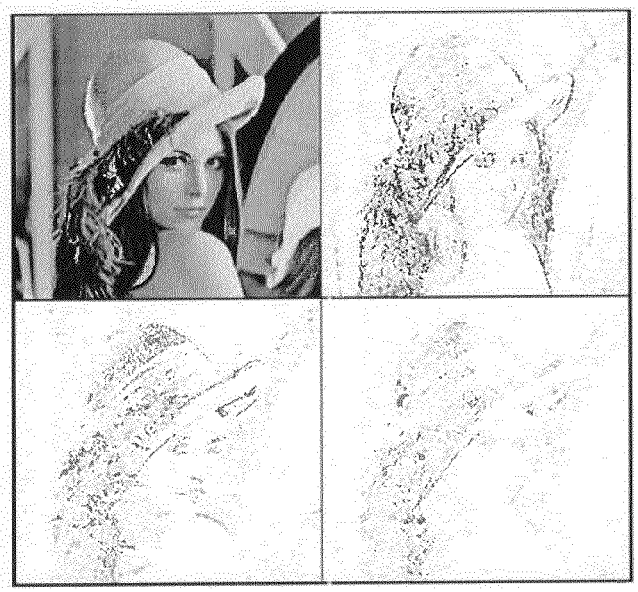
SPLITTING LEVEL = 1
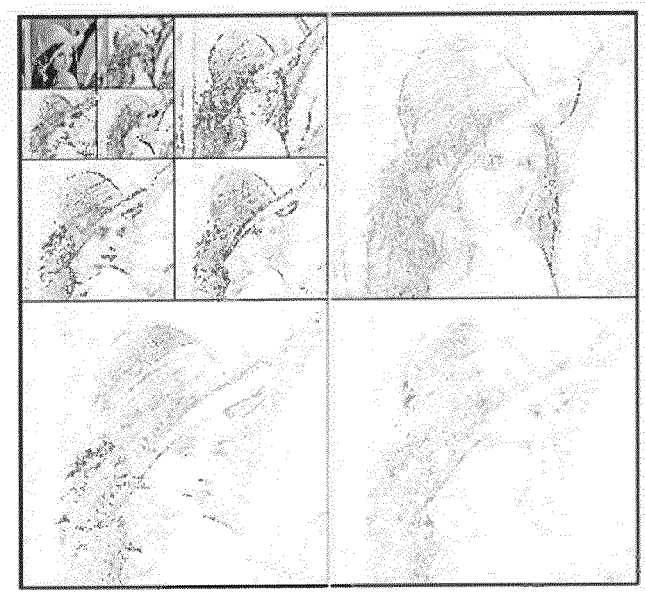
SPLITTING LEVEL = 3

FIG. 13

EXAMPLE OF VIDEO DATA IN Video Short REGION

| Byte# | 7 | 6 | 5 | 4 | 3 | 2 | 1 | 0 |
|---|---|---|---|---|---|---|---|---|
| 0 | Video tag code (=2) | | | Length (=L) | | | | |
| 1 | CEA Short Video Descriptor 1 = &H85 (1920x1080i 60 Hz 16:9 Native Mode) | | | | | | | |
| 2 | CEA Short Video Descriptor 2 = &H02 (720x480i 60 Hz 4:3) | | | | | | | |
| 3 | CEA Short Video Descriptor 3 = &H03 (720x480p 60 Hz 16:9) | | | | | | | |
| 4 | CEA Short Video Descriptor 4 = &H04 (1280x720p 60 Hz 16:9) | | | | | | | |
| 5 | CEA Short Video Descriptor 5 = &H16 (1920x1080p 60 Hz 16:9) | | | | | | | |
| 6...L-1 | ... | | | | | | | |
| L | CEA Short Video Descriptor L = &H46 (1920x1080i 120 Hz 16:9) | | | | | | | |

FIG. 14

EXEMPLARY DATA STRUCTURE IN Vendor Specific REGION

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1...3 | 24bit IEEE Registration Identifier (0x000C03) LSB first | | | | | | | |
| 4 | A | | | | | B | | |
| 5 | C | | | | | D | | |
| 6 | Supports-AI | DC_48bit | DC_36bit | DC_30bit | DC_Y444 | Reserved (0) | | DVI-Dual |
| 7 | Max_TMDS_Clock | | | | | | | |
| 8 | Latency | | | Reserved (0) | | | | |
| 9 | Video Latency | | | | | | | |
| 10 | Audio Latency | | | | | | | |
| 11 | Interlaced Video Latency | | | | | | | |
| 12 | Interlaced Audio Latency | | | | | | | |
| 13...N | Reserved (0) | | | | | | | |

FIG. 18

HDMI PIN ARRANGEMENT (IN CASE OF Type-A)

| PIN | Signal Assignment | PIN | Signal Assignment |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Reserved(N.C. on device) |
| 15 | SCL | 16 | SDA |
| 17 | DDC/CEC Ground | 18 | +5V Power |
| 19 | Hot Plug Detect | | |

INFORMATION PROCESSING DEVICE AND METHOD

TECHNICAL FIELD

The present invention relates to an information processing apparatus and method, and more particularly, to an information processing apparatus and method which make it possible to transmit image data with high quality and low delay in more versatile situations.

BACKGROUND ART

There is an eye-opening technical development in household digital video devices, and an increase in the resolution of video is one example of this development. However, it can be said that connections among devices such as camcorders that capture video images using cameras, devices that record and reproduce television programs (DVD (Digital Versatile Disc) recorders, BD (Blue-Ray Disc) recorders, and the like), game devices, and television receivers are less than perfect.

MPEG-2 (Moving Picture Experts Group phase 2) is used, for example, at the time of compressing an HDTV (HighDefinition Television) interlaced moving image in BS (Broadcasting Satellite) digital broadcasting. MPEG-2 is also used in all DVD software. Video streams compressed using MPEG-2 is recorded in DVD software.

In addition, AVC (Advanced Video Coding) which has a compression ratio twice as high as that of MPEG-2 has been started to be employed in camcorders in recent years for its compression efficiency. Regarding BD recorders as well, products that have AVC encoders installed therein and feature long-time recording as a sales point have become available on the market. In contrast, HDMI (High Definition Multimedia Interface) has been becoming an industry standard as an interface that connects digital devices. For example, Patent Document 1 describes the details of the HDMI standard.

HDMI is an interface for digital household devices. HDMI is arranged for AV (Audio Visual) household devices by adding an audio transmission function, a copyright protection function (unauthorized copy preventing function for digital content or the like), and a chrominance transmission function to DVI (DigitalVisual Interface) which is a connection standard between a PC (Personal Computer) and a display. The HDMI 1.0 specification has been established in December of 2002.

HDMI transmits non-compressed digital audio and video and has an advantage that there is no image quality/sound quality deterioration. HDMI is currently standardized on the full-specification high-definition television (full HD: resolution is horizontal 1920 pixels×vertical 1080 lines) function. Since video and audio can be transferred without compression from a player to a television side, a dedicated chip or software such as a decoder is not required. Also, an intelligent function is provided, with which connected devices can recognize each other.

Also, since video/audio/control signals are sent through a single cable, there is an advantage that the wiring between AV devices can be simplified. Since a control signal and the like can be sent, AV devices can easily operate in conjunction with one another.

Patent Document 1: WO2002/078336

DISCLOSURE OF INVENTION

Technical Problem

However, a case in which data transmission using a network other than HDMI as a transmission line is also conceivable. In that case, with a conventional method, it may become difficult to transmit image data with high quality and low delay. Also, since the performance of a receiver side differs from one device to another, depending on the communication partner, it may become difficult to transmit image data with high quality and low delay using a conventional method.

The present invention is proposed in view of such conventional circumstances and makes it possible to transmit image data with high quality and low delay in more versatile situations.

Technical Solution

An aspect of the present invention is an information processing apparatus including: selecting means for selecting whether or not to encode image data to be transmitted; filtering means for performing, in a case where it has been selected by the selecting means to encode the image data, a process of decomposing the image data in increments of a frequency band and generating sub-bands including coefficient data in increments of the frequency band, in increments of a line block including the image data equivalent to a number of lines needed to generate coefficient data equivalent to one line of sub-bands of at least lowest frequency components; reordering means for reordering the coefficient data, which has been generated by the filtering means in order from high frequency components to low frequency components, in order from low frequency components to high frequency components; encoding means for encoding the coefficient data reordered by the reordering means; and sending means for sending encoded data generated by encoding the coefficient data using the encoding means to another information processing apparatus via a transmission line.

The selecting means may select whether or not to encode the image data depending on whether or not a transmission-allowed bit rate of the transmission line is greater than a bit rate of the image data.

The information processing apparatus may further include obtaining means for obtaining, from the other information processing apparatus, information regarding performance of the other information processing apparatus.

The sending means may send predetermined encoded data to the other information processing apparatus. The obtaining means may obtain information indicating a result of reception and decoding of the encoded data in the other information processing apparatus. The selecting means may select whether or not to encode the image data based on the information indicating the result of reception and decoding of the encoded data, which has been obtained by the obtaining means.

The obtaining means may obtain information of a delay time in a decoding process of the other information processing apparatus. The encoding means may set a delay time in an encoding process based on the information of the delay time, which has been obtained by the obtaining means.

The obtaining means may obtain information of a resolution of the image data in the other information processing apparatus. The encoding means may set a resolution of encoded data to be generated based on the information of the resolution, which has been obtained by the obtaining means.

In a case where a format of the image data to be encoded is 4:2:0, the filtering means may reduce a decomposition number of a chrominance component of the image data to be one less than a decomposition number of a luminance component of the image data.

In addition, an aspect of the present invention is an information processing method, wherein: selecting means selects whether or not to encode image data to be transmitted; filtering means performs, in a case where it has been selected to encode the image data, a process of decomposing the image data in increments of a frequency band and generating sub-bands including coefficient data in increments of the frequency band, in increments of a line block including the image data equivalent to a number of lines needed to generate coefficient data equivalent to one line of sub-bands of at least lowest frequency components; reordering means reorders the coefficient data, which has been generated in order from high frequency components to low frequency components, in order from low frequency components to high frequency components; encoding means encodes the reordered coefficient data; and sending means sends encoded data generated by encoding the coefficient data to another information processing apparatus via a transmission line.

In an aspect of the present invention, whether or not to encode image data to be transmitted is selected. When it has been selected to encode the image data, a process of decomposing the image data in increments of a frequency band and generating sub-bands including coefficient data in increments of the frequency band is performed in increments of a line block including the image data equivalent to a number of lines needed to generate coefficient data equivalent to one line of sub-bands of at least lowest frequency components. The coefficient data, which has been generated in order from high frequency components to low frequency components, is reordered in order from low frequency components to high frequency components. The reordered coefficient data is encoded. Encoded data generated by encoding the coefficient data is sent to another information processing apparatus via a transmission line.

Advantageous Effects

According to the present invention, image data can be transmitted. In particular, image data can be transmitted with high quality and low delay in more versatile situations.

BRIEF DESCRIPTION OF DRAWINGS

FIG. 4 includes outline diagrams for describing the outline of wavelet transform.

FIG. 13 is a diagram showing an example of video data in a Video Short region.

FIG. 14 is a diagram showing an exemplary data structure in a Vendor Specific region.

FIG. 18 is a diagram showing a pin arrangement (type A) of HDMI terminals.

EXPLANATION OF REFERENCE NUMERALS

100 transmission system, 101 sending apparatus, 102 receiving apparatus, 103 transmission line, 111 control unit, 112 switching unit, 113 encoding unit, 114 communication unit, 121 control unit, 122 communication unit, 123 switching unit, 124 decoding unit, 125 switching unit, 151 wavelet transform unit, 152 intermediate calculation buffer unit, 153 coefficient reordering buffer unit, 154 coefficient reordering unit, 155 entropy coding unit, 161 entropy decoding unit, 162 coefficient buffer unit, 163 inverse wavelet transform unit, 211 HDMI transmitter, 212 HDMI receiver, 213 DDC, 214 CEC

BEST MODES FOR CARRYING OUT THE INVENTION

Hereinafter, embodiments of the present invention will be described.

Figure 1:
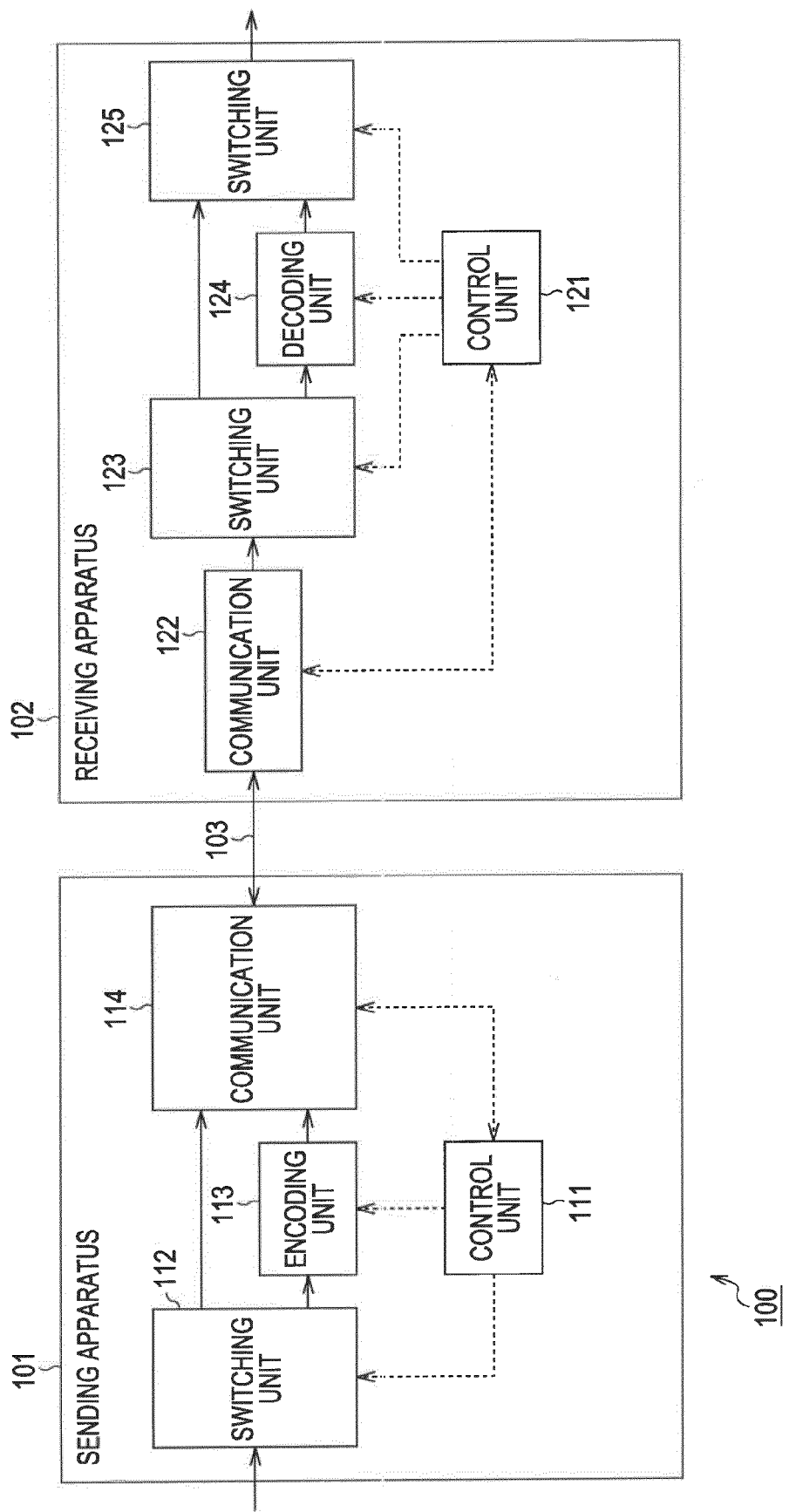
FIG. 1 is a diagram showing an exemplary configuration of a transmission system to which the present invention is applied.

FIG. 1 is a block diagram showing an exemplary configuration of a transmission system to which the present invention is applied.

In FIG. 1, a transmission system 100 is a system that transmits image data from a sending apparatus 101 to a receiving apparatus 102 via a transmission line 103. The sending apparatus 101 and the receiving apparatus 102 exchange baseband image data or encoded data generated by encoding the image data via the transmission line 103. When exchanging encoded data, the sending apparatus 101 generates encoded data by encoding input baseband image data using a predetermined method and sends this to the receiving apparatus 102. The receiving apparatus 102 receives the encoded data, decodes the received encoded data using a decoding method corresponding to the encoding method performed by the sending apparatus 101 to generate baseband image data (decoded image), and outputs the baseband image data.

Alternatively, when transmitting baseband image data, the sending apparatus 101 sends input baseband image data as it is as baseband data to the receiving apparatus 102. When the receiving apparatus 102 receives the baseband image data, the receiving apparatus 102 outputs this as it is as baseband data to the outside.

The sending apparatus 101 and the receiving apparatus appropriately select, according to situation, whether to transmit encoded data or baseband image data. Accordingly, the transmission system 100 can transmit image data with high quality and low delay in more versatile situations.

As shown in FIG. 1, the sending apparatus 101 includes a control unit 111, a switching unit 112, an encoding unit 113, and a communication unit 114.

The control unit 111 controls the operation of the switching unit 112, the encoding unit 113, and the communication unit 114. The switching unit 112 switches a connection destination, thereby selecting whether to supply input baseband image data to the encoding unit 113 or the communication unit 114. The encoding unit 113 encodes the baseband image data supplied from the switching unit 112 using a predetermined method to generate encoded data. The encoding unit 113 supplies the generated encoded data to the communication unit 114. The communication unit 114 sends the baseband image data supplied from the switching unit 112 or the encoded data supplied from the encoding unit 113 to the receiving apparatus 102 via the transmission line 103 using a method based on the standard of the transmission line 103.

For example, when transmitting baseband image data, the control unit 111 controls the switching unit 112 to supply the input baseband image data to the communication unit 114. Also, the control unit 111 controls the communication unit to transmit the baseband image data to the receiving apparatus 102 via the transmission line 103 using a method based on the standard of the transmission line 103.

Alternatively, for example, when transmitting encoded data, the control unit 111 controls the switching unit 112 to supply the input baseband image data to the encoding unit 113. The control unit 111 controls the encoding unit 113 to encode the baseband image data and to supply the generated encoded data to the communication unit 114. Also, the control unit 111 controls the communication unit 114 to transmit the encoded data to the receiving apparatus 102 via the transmission line 103 using a method based on the standard of the transmission line 103.

Also, as shown in FIG. 1, the receiving apparatus 102 includes a control unit 121, a communication unit 122, a switching unit 123, a decoding unit 124, and a switching unit 125.

The control unit 121 controls the operation of the switching unit 112, the communication unit 122, the switching unit 123, the decoding unit 124, and the switching unit 125. The communication unit 122 obtains the baseband image data or the encoded data, which has been sent from the sending apparatus 101, via the transmission line 103 and supplies this to the switching unit 123. The switching unit switches a connection destination, thereby supplying the supplied baseband image data to the switching unit 125. Alternatively, the switching unit 123 switches the connection destination, thereby supplying the supplied encoded data to the decoding unit 124. The decoding unit decodes the encoded data supplied from the switching unit 123 using a predetermined decoding method corresponding to the encoding method performed by the encoding unit 113 to generate baseband image data (restored image).

The switching unit 125 switches a connection destination, thereby outputting the baseband image data supplied from the switching unit 123 or the decoding unit to the outside of the receiving apparatus 102.

For example, when transmitting baseband image data, the control unit 121 controls the communication unit 122 to receive the baseband image data and supply the baseband image data to the switching unit 123. The control unit 121 controls the switching unit 123 to supply the baseband image data to the switching unit 125. Further, the control unit controls the switching unit 125 to output the baseband image data to the outside of the receiving apparatus 102.

Alternatively, for example, when transmitting encoded data, the control unit 121 controls the communication unit 122 to receive encoded data sent from the sending apparatus 101 and supply this to the switching unit 123. Also, the control unit 121 controls the connection destination of the switching unit 123, thereby supplying the supplied encoded data to the decoding unit 124. Further, the control unit 121 controls the decoding unit 124 to decode the encoded data and supply the generated baseband image to the switching unit 125. Also, the control unit 121 controls a connection source of the switching unit 125 to output the baseband image data supplied from the decoding unit 124 to the outside of the receiving apparatus 102.

Figure 2:
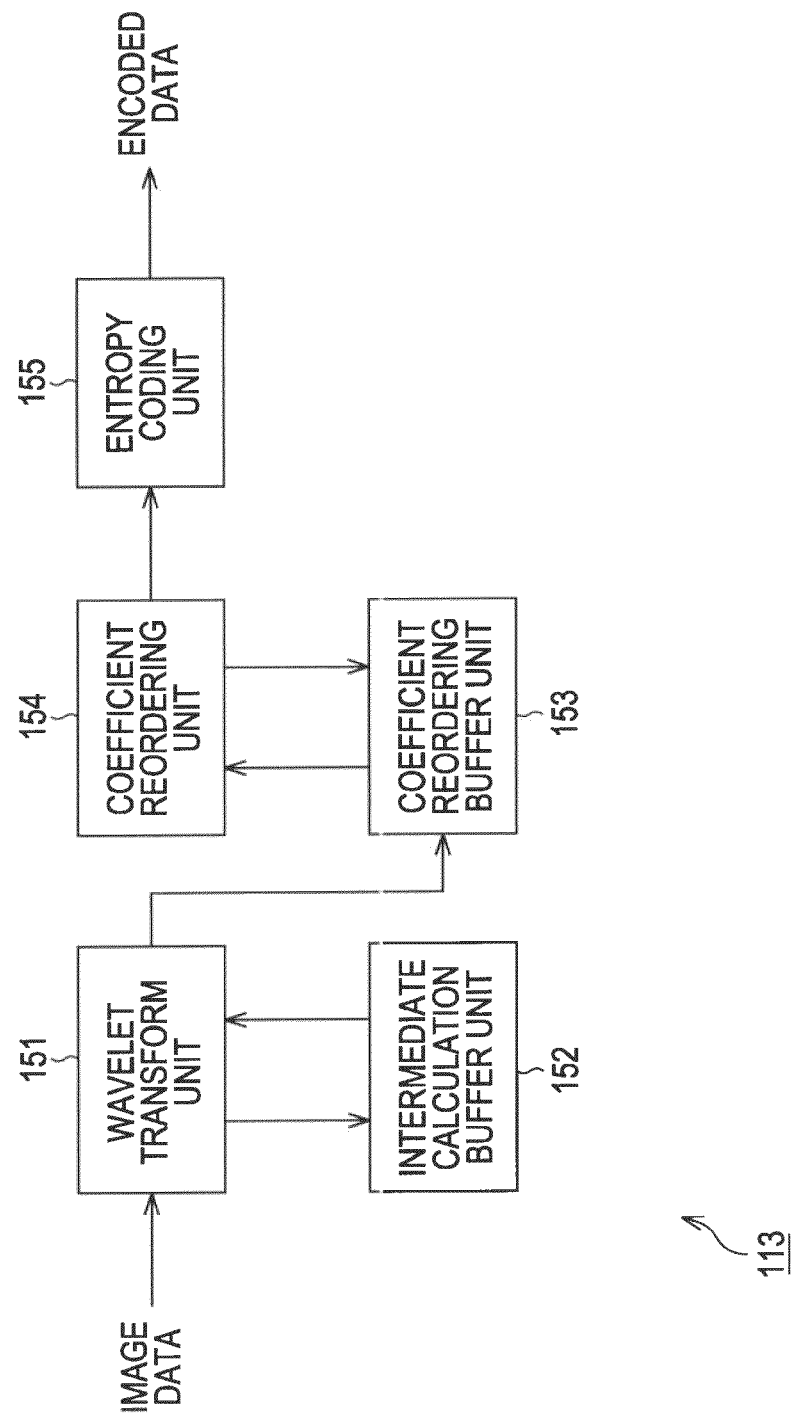
FIG. 2 is a block diagram showing an exemplary structure of an encoding unit in FIG. 1.

FIG. 2 is a block diagram showing a detailed exemplary structure of the encoding unit 113 in the sending apparatus 101. As shown in FIG. 2, the encoding unit 113 includes functions of a wavelet transform unit 151, an intermediate calculation buffer unit 152, a coefficient reordering buffer unit 153, a coefficient reordering unit 154, and an entropy coding unit 155.

Image data input to the encoding unit 113 is temporarily accumulated in the intermediate calculation buffer unit 152 via the wavelet transform unit 151. The wavelet transform unit 151 applies wavelet transform to the image data accumulated in the intermediate calculation buffer unit 152. That is, the wavelet transform unit 151 reads out image data from the intermediate calculation buffer unit 152, applies a filtering process to the image data using an analysis filter to generate coefficient data of low frequency components and high frequency components, and stores the generated coefficient data in the intermediate calculation buffer unit 152. The wavelet transform unit 151 includes a horizontal analysis filter and a vertical analysis filter and performs an analysis filtering process in both a screen horizontal direction and a screen vertical direction on a group of items of image data. The wavelet transform unit 151 reads out again the coefficient data of low frequency components, which is stored in the intermediate calculation buffer unit 152, and applies a filtering process to the read-out coefficient data using the analysis filters to further generate coefficient data of high frequency components and low frequency components. The generated coefficient data is stored in the intermediate calculation buffer unit 152.

When a decomposition level reaches a predetermined level as a result of repeating this process, the wavelet transform unit 151 reads out the coefficient data from the intermediate calculation buffer unit 152 and writes the read-out coefficient data into the coefficient reordering buffer unit 153.

The coefficient reordering unit 154 reads out the coefficient data written in the coefficient reordering buffer unit 153 in a predetermined order and supplies the read-out coefficient data to the entropy coding unit 155. The entropy coding unit 155 quantizes the supplied coefficient data using a predetermined method and encodes the quantized coefficient data using a predetermined entropy coding scheme, such as Huffman coding or arithmetic coding. The entropy coding unit 155 outputs the generated encoded data to the outside of the encoding unit 113.

Figure 3:
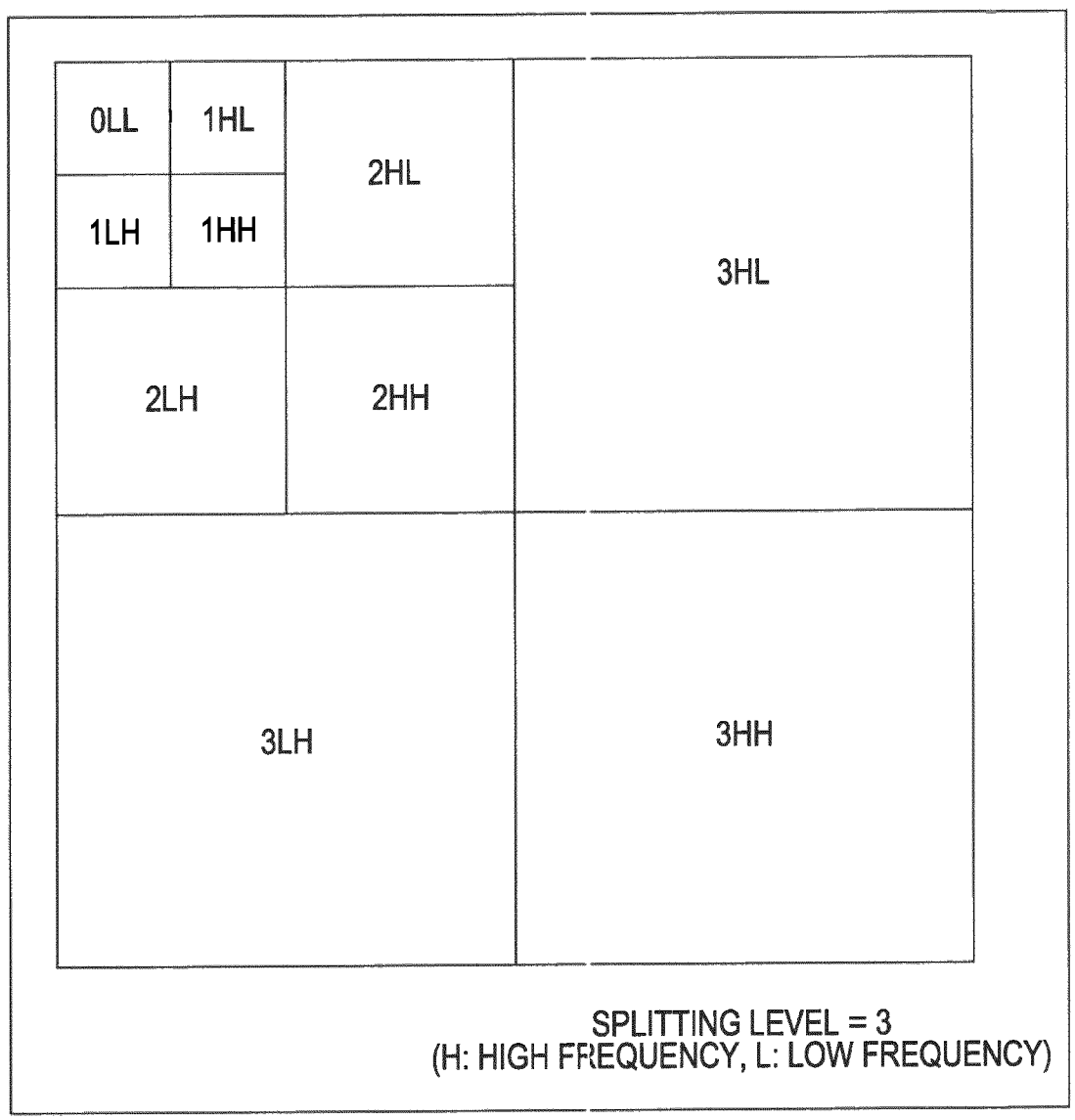
FIG. 3 is an outline diagram for describing the outline of wavelet transform.

Next, a process performed by the wavelet transform unit 151 in FIG. 2 will be more specifically described. First, the outline of wavelet transform will be described. With wavelet transform of image data, as the outline thereof is shown in FIG. 3, a process of splitting image data into a high spatial frequency band and a low spatial frequency band is recursively repeated on data in the low spatial frequency band obtained as a result of splitting. By driving data in a low spatial frequency band into a smaller region in this manner, efficient compression and encoding are made possible.

Note that FIG. 3 corresponds to an example in the case where a process of splitting the lowest frequency component region of image data into a region L of low frequency components and a region H of high frequency components is repeated three times, and a splitting level indicating the total number of split layers is 3. In FIG. 3, "L" and "H" represent low frequency components and high frequency components, respectively. The order of "L" and "H" indicates that the former indicates the band obtained as a result of the splitting in a horizontal direction, and the latter indicates the band obtained as a result of the splitting in a vertical direction. Also, a numeral before "L" and "H" indicates the layer of that region. The layer of lower frequency components is represented by a smaller numeral. The maximum value of this layer indicates the splitting level (splitting number) at that time of wavelet transform.

Also, as is clear from the example in FIG. 3, processing is performed step by step from the lower right region to the upper left region of a screen, and thereby low frequency components are driven. That is, in the example in FIG. 3, the lower right region of the screen serves as a region 3HH including the smallest number of low frequency components (including the largest number of high frequency components). The upper left region obtained by splitting the screen into four regions is further split into four regions, and, among these four regions, the upper left region is further split into four regions. The region in the upper leftmost corner serves as a region 0LL including the largest number of low frequency components.

The transform and splitting are repeatedly performed on low frequency components since the energy of the image is concentrated in the low frequency components. This can be understood from the fact that, as the splitting level progresses from a state in which the splitting level=1, an example of which is shown in A of FIG. 4, to a state in which the splitting level=3, an example of which is shown in B of FIG. 4, sub-bands are formed, as shown in B of FIG. 4. For example, the splitting level of wavelet transform in FIG. 3 is 3, and, as a result, ten sub-bands are formed.

The wavelet transform unit 151 usually uses a filter bank constituted of a low frequency filter and a high frequency filter to perform a process such as that described above. Note that a digital filter usually has the impulse response of multiple tap lengths, i.e., filter coefficients, and accordingly it is necessary to buffer in advance as many items of input image data or coefficient data as are needed to perform a filtering process. Also, as in the case where wavelet transform is performed in multiple stages, it is necessary to buffer as many wavelet transform coefficients generated at the previous stages as are needed to perform a filtering process.

As a specific example of this wavelet transform, a method using a 5×3 filter will be described. This method of using the 5×3 filter is adopted by the JPEG 2000 standard as well and is an excellent method since it can perform wavelet transform using a small number of filter taps.

The impulse response of the 5×3 filter (Z transform representation) is constituted of, as indicated by equation (1) and equation (2) below, a low frequency filter $H_0(z)$ and a high frequency filter $H_1(z)$.

$$H_0(z)=(-1+2z^{-1}+6z^{-2}+2z^{-3}-z^{-4})/8 \quad (1)$$

$$H_1(z)=(-1+2z^{-1}-z^{-2})/2 \quad (2)$$

According to these equation (1) and equation (2), coefficients of low frequency components and high frequency components can be directly calculated. Here, calculations involved in a filtering process can be reduced by using the lifting technique.

Figure 5:
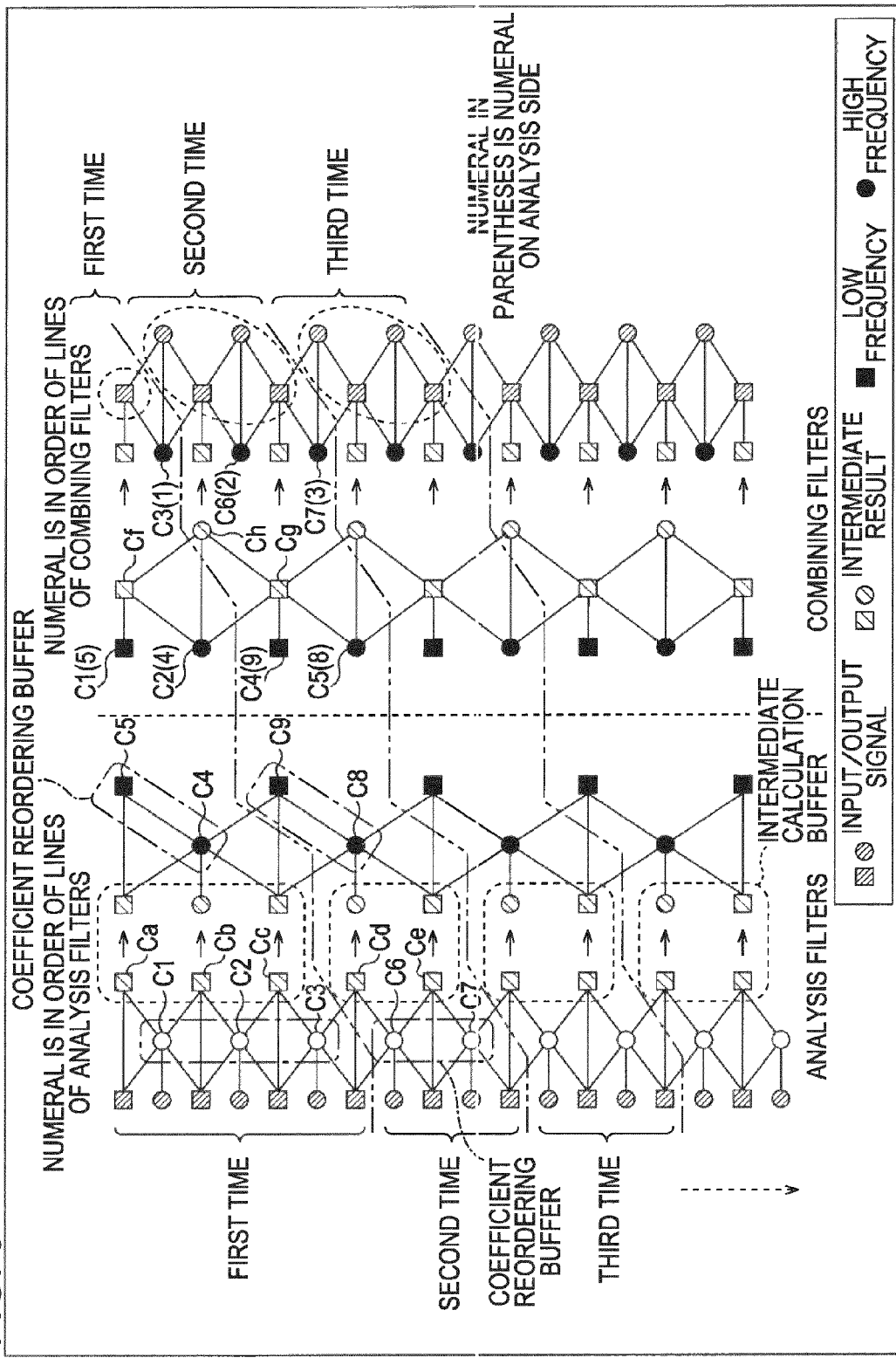
FIG. 5 is an outline diagram showing an example of the manner of lifting using a 5×3 filter.

Next, this wavelet transform method will be more specifically described. FIG. 5 shows an example in which a filtering process based on the lifting using the 5×3 filter is executed up to the decomposition level=2. Note that, in FIG. 5, a portion indicated as analysis filters on the left side of the drawing includes the filters of the wavelet transform unit 151 in FIG. 2. Also, a portion indicated as combining filters on the right side of the drawing includes filters of an inverse wavelet transform unit described later.

Note that, in the following description, it is assumed that, for example, in a display device or the like, one line is configured by scanning pixels from the left end to the right end of the screen, with the pixel at the upper left corner of the screen serving as the head, and one screen is configured by performing scanning from the upper end to the lower end of the screen on a line-by-line basis.

In FIG. 5, the leftmost column shows pixel data disposed at corresponding positions on a line of original image data being arrayed in the vertical direction. That is, a filtering process in the wavelet transform unit 151 is performed by vertically scanning pixels on the screen using a vertical filter. The first column through the third column from the left end show a filtering process at the splitting level=1, and the fourth column through the sixth column show a filtering process at the splitting level=2. The second column from the left end shows a high frequency component output based on the pixels of the original image data at the left end, and the third column from the left end shows a low frequency component output based on the original image data and the high frequency component output. Regarding the filtering process at the splitting level=2, as shown in the fourth column through the sixth column from the left end, a process is performed on the output of the filtering process at the splitting level=1.

In the filtering process at the decomposition level=1, as a filtering process at a first stage, coefficient data of high frequency components is calculated on the basis of the pixels of the original image data; and, as a filtering process at a second stage, coefficient data of low frequency components is calculated on the basis of the coefficient data of high frequency components, which has been calculated in the filtering process at the first stage, and the pixels of the original image data. An exemplary filtering process at the decomposition level=1 is shown in the first column through the third column on the left side (analysis filter side) in FIG. 5. The calculated coefficient data of high frequency components is stored in the coefficient reordering buffer unit 153 in FIG. 2. Also, the calculated coefficient data of low frequency components is stored in the intermediate calculation buffer unit 152 in FIG. 2.

In FIG. 5, the coefficient reordering buffer unit 153 is shown as portions surrounded by dotted-chain lines, and the intermediate calculation buffer unit 152 is shown as portions surrounded by dotted lines.

A filtering process at the decomposition level=2 is performed on the basis of the result of the filtering process at the decomposition level=1, which is held in the intermediate calculation buffer unit 152. In the filtering process at the decomposition level=2, the coefficient data calculated as coefficients of low frequency components in the filtering process at the decomposition level=1 is regarded as coefficient data including low frequency components and high frequency components, and a filtering process similar to that at the decomposition level=1 is performed. Coefficient data of high frequency components and coefficient data of low frequency components calculated in the filtering process at the decomposition level=2 are stored in the coefficient reordering buffer unit 153.

The wavelet transform unit 151 performs a filtering process such as that described above both in the horizontal direction and in the vertical direction of the screen. For example, firstly, the wavelet transform unit 151 performs a filtering process at the decomposition level=1 in the horizontal direction, and stores generated coefficient data of high frequency components and low frequency components in the intermediate calculation buffer unit 152. Next, the wavelet transform unit 151 performs a filtering process at the decomposition level=1 in the vertical direction on the coefficient data stored in the intermediate calculation buffer unit 152. With the processes at the decomposition level=1 in the horizontal and vertical directions, four regions, a region HH and a region HL based on corresponding items of coefficient data obtained by further decomposing the high frequency components into high frequency components and low frequency components, and a region LH and a region LL based on corresponding items of coefficient data obtained by further decomposing the low frequency components into high frequency components and low frequency components, are formed.

Subsequently, at the decomposition level=2, a filtering process is performed both in the horizontal direction and the vertical direction on the coefficient data of low frequency components generated at the decomposition level=1. That is, at the decomposition level=2, the region LL split and formed at the decomposition level=1 is further split into four regions, and a region HH, a region HL, a region LH, and a region LL are further formed in the region LL.

The wavelet transform unit 151 is configured to perform a filtering process based on wavelet transform multiple times in a stepwise manner by splitting the filtering process into processing of each of groups of several lines in the vertical direction of the screen. In the example in FIG. 5, a first process which is a process starting with the first line on the screen performs a filtering process on seven lines. A second process which is a process starting with the eighth line and thereafter performs a filtering process in increments of four lines. This number of lines is based on the number of lines needed to generate the lowest frequency components equivalent to one line after decomposition into two, high frequency components and low frequency components, is performed.

Note that, hereinafter, a group of lines, which includes other sub-bands, needed to generate the lowest frequency components equivalent to one line (coefficient data equivalent to one line of sub-bands of lowest frequency components) will be referred to as a precinct (or line block). The line stated here indicates pixel data or coefficient data equivalent to one line formed in a picture (frame or field) corresponding to image data before wavelet transform, or in each sub-band.

That is, the precinct (line block) indicates, in the original image data before the wavelet transform, a pixel data group equivalent to the number of lines needed to generate coefficient data equivalent to one line of sub-bands of lowest frequency components after the wavelet transform, or a coefficient data group of each sub-band obtained by performing wavelet transform of this pixel data group.

According to FIG. 5, a coefficient C5 obtained as a result of performing a filtering process at the decomposition level=2 is calculated on the basis of a coefficient C4 and a coefficient Ca that is stored in the intermediate calculation buffer unit 152, and the coefficient C4 is calculated on the basis of the coefficient Ca, a coefficient Cb, and a coefficient Cc which are stored in the intermediate calculation buffer unit 152. Further, the coefficient Cc is calculated on the basis of a coefficient C2 and a coefficient C3 which are stored in the coefficient reordering buffer unit 153, and pixel data of the fifth line. Also, the coefficient C3 is calculated on the basis of pixel data of the fifth line through the seventh line. Accordingly, in order to obtain the coefficient C5 of low frequency components at the splitting level=2, pixel data of the first line through the seventh line is needed.

In contrast, in the second filtering process and thereafter, the coefficient data already calculated in the filtering process(es) so far and stored in the coefficient reordering buffer unit 153 can be used, and hence the number of lines needed can be kept small.

That is, according to FIG. 5, among coefficients of low frequency components obtained as a result of a filtering process at the decomposition level=2, a coefficient C9 which is the next coefficient of the coefficient C5 is calculated on the basis of the coefficient C4, a coefficient C8, and the coefficient Cc which is stored in the intermediate calculation buffer unit 152. The coefficient C4 has already been calculated with the above-described first filtering process and stored in the coefficient reordering buffer unit 153. Similarly, the coefficient Cc has already been calculated with the above-described first filtering process and stored in the intermediate calculation buffer unit 152. Accordingly, in this second filtering process, only a filtering process for calculating the coefficient C8 is newly performed. This new filtering process is performed by further using the eighth line through the eleventh line.

Since the second filtering process and thereafter can use the data calculated with the filtering process(es) so far and stored in the intermediate calculation buffer unit 152 and the coefficient reordering buffer unit 153, all that is needed is each process in increments of four lines.

Note that, when the number of lines on the screen does not match the number of lines for encoding, the lines of the original image data are copied with a predetermined method so that the number of lines becomes identical to the number of lines for encoding, and then a filtering process is performed.

Accordingly, a filtering process for obtaining as many as items of coefficient data equivalent to one line of the lowest frequency components is performed multiple times in a stepwise manner on the lines of the whole screen (on a precinct-by-precinct basis), thereby enabling a decoded image to be obtained with low delay when encoded data is transmitted.

Next, a process performed by the coefficient reordering unit 154 in FIG. 2 will be described. As has been described above, items of coefficient data calculated at the wavelet transform unit 151 are stored in the coefficient reordering buffer unit 153, of which the order is reordered and read out by the coefficient reordering unit 154, and sent to the entropy coding unit 155 in units of coding units.

As has been already described, in wavelet transform, coefficients are generated from a high frequency component side to a low frequency component side. In the example in FIG. 5, at the first time, a coefficient C1, the coefficient C2, and the coefficient C3 of high frequency components are sequentially generated in a filtering process at the decomposition level=1 on the basis of pixel data of an original image. Subsequently, a filtering process at the decomposition level=2 is performed on coefficient data of low frequency components, which is obtained in the filtering process at the decomposition level=1, and accordingly the coefficient C4 and the coefficient C5 of low frequency components are sequentially generated. That is, at the first time, coefficient data is generated in order of the coefficient C1, the coefficient C2, the coefficient C3, the coefficient C4, and the coefficient C5. The generating order of coefficient data always becomes this order (order from high frequency to low frequency) because of the principle of wavelet transform.

In contrast, on the decoding side, in order to immediately perform decoding with low delay, it is necessary to perform generation and output of an image, starting with low frequency components. Therefore, it is desirable to reorder the coefficient data generated on the encoding side from the lowest frequency component side toward the high frequency component side and supply the reordered coefficient data to the decoding side.

Description will be made more specifically using the example in FIG. 5. The right side in FIG. 5 shows a combining filter side for performing inverse wavelet transform. A first combining process including the first line of output image data (inverse wavelet transform process) on the decoding side is performed using the coefficient C4 and coefficient C5 of the lowest frequency components, which are generated in the first filtering process on the encoding side, and the coefficient C1.

That is, in the first combining process, the coefficient data is supplied in order of the coefficient C5, the coefficient C4, and the coefficient C1 from the encoding side to the decoding side, and, on the decoding side, with a process at a combining level=2 which is a combining process corresponding to the decomposition level=2, a combining process is performed on the coefficient C5 and the coefficient C4 to generate a coefficient Cf, and the coefficient Cf is stored in the buffer. Subsequently, with a process at the combining level=1 which is a combining process corresponding to the decomposition level=1, a combining process is performed on this coefficient Cf and the coefficient C1 to output the first line.

Thus, in the first combining process, the coefficient data generated in order of the coefficient C1, the coefficient C2, the coefficient C3, the coefficient C4, and the coefficient C5 on the encoding side and stored in the coefficient reordering buffer unit 153 is reordered in order of the coefficient C5, the coefficient C4, the coefficient C1, . . . and supplied to the decoding side.

Note that, on the combining filter side shown on the right side in FIG. 5, for a coefficient supplied from the encoding side, a coefficient numeral on the encoding side is described in parentheses, and the line order of combining filters is described outside the parentheses. For example, a coefficient C1(5) indicates that this is the coefficient C5 on the analysis filter side on the left side in FIG. 5, and is the first line on the combining filter side.

A combining process on the decoding side of the coefficient data generated in a second filtering process and thereafter on the encoding side can be performed using the coefficient data combined at the time of the previous combining process or supplied from the encoding side. In the example in FIG. 5, a second combining process on the decoding side, which is performed using the coefficient C8 and the coefficient C9 of low frequency components, which are generated in the second filtering process on the encoding side, further needs the coefficient C2 and the coefficient C3 generated in the first filtering process on the encoding side, and the second line through the fifth line are decoded.

That is, in the second combining process, the coefficient data is supplied in order of the coefficient C9, the coefficient C8, the coefficient C2, and the coefficient C3 from the encoding side to the decoding side. On the decoding side, in a process at the combining level=2, a coefficient Cg is generated using the coefficient C8, the coefficient C9, and the coefficient C4 which is supplied from the encoding side at the time of the first combining process, and the coefficient Cg is stored in the buffer. Using this coefficient Cg, the above-described coefficient C4, and the coefficient Cf generated in the first combining process and stored in the buffer, a coefficient Ch is generated and stored in the buffer.

Subsequently, in a process at the combining level=1, a combining process is performed using the coefficient Cg and the coefficient Ch generated in the process at the combining level=2 and stored in the buffer, and the coefficient C2 (shown as a coefficient C6(2) at combining filters) and the coefficient C3 (shown as a coefficient C7(3) at combining filters) supplied from the encoding side, and the second line through the fifth line are decoded.

Accordingly, in the second combining process, the coefficient data generated in order of the coefficient C2, the coefficient C3, (the coefficient C4, the coefficient C5), the coefficient C6, the coefficient C7, the coefficient C8, and the coefficient C9 on the encoding side is reordered in order of the coefficient C9, the coefficient C8, the coefficient C2, the coefficient C3, . . . , and supplied to the decoding side.

In a third combining process and thereafter as well, similarly, the coefficient data stored in the coefficient reordering buffer unit 152 is reordered in a predetermined order and supplied to the decoding unit, and the lines are decoded four lines at a time.

Note that, in a combining process on the decoding side corresponding to a filtering process including the lower end line of the screen on the encoding side (hereinafter referred to as the last time), the entire coefficient data generated in the processes so far and stored in the buffer is output, and hence, the number of output lines increases. In the example in FIG. 5, eight lines are output at the last time.

Note that a reordering process of coefficient data using the coefficient reordering unit 154 is performed, for example, by setting read-out addresses at the time of reading out the coefficient data stored in the coefficient reordering buffer unit 153 in a predetermined order.

The processes up to those described above will be described more specifically using FIG. 5. FIG. 5 corresponds to an example in which a filtering process based on wavelet transform is applied up to the decomposition level=2 using a 5×3 filter. In the wavelet transform unit 151, as shown in an example in A of FIG. 6, a first filtering process is performed both in the horizontal and vertical directions on the first line through the seventh line of input image data (In-1 in A of FIG. 6).

Figure 6:
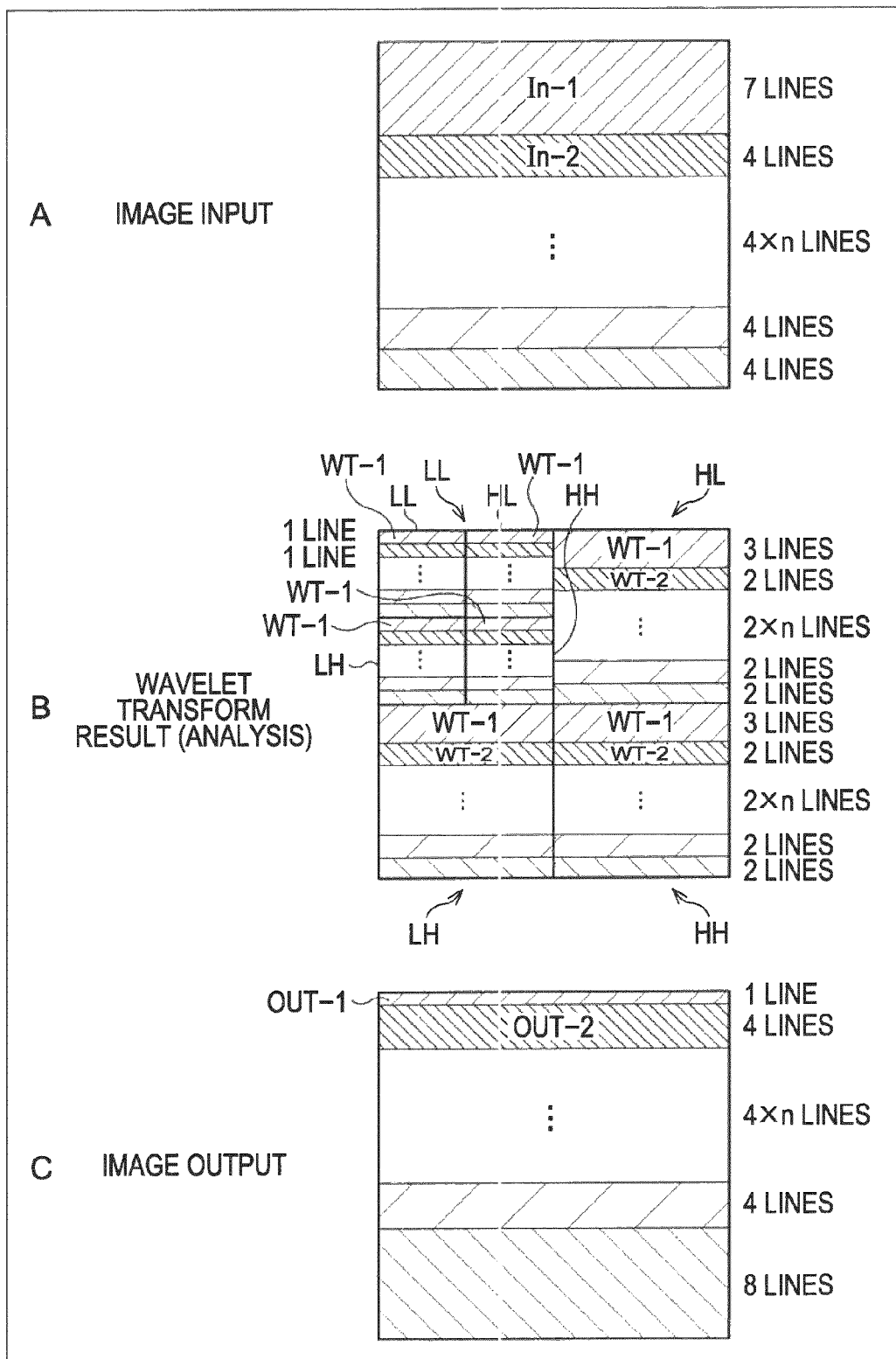
FIG. 6 includes outline diagrams showing the outline of flow of wavelet transform and inverse wavelet transform.

In a process at the decomposition level=1 in the first filtering process, items of coefficient data equivalent to three lines, the coefficient C1, the coefficient C2, and the coefficient C3, are generated, and, as shown in an example in B of FIG. 6, are respectively disposed in the region HH, the region HL, and the region LH which are formed at the decomposition level=1 (WT-1 in B of FIG. 6).

Also, the region LL formed at the decomposition level=1 is further split into four regions with a filtering process at the decomposition level=2 in the horizontal and vertical directions. With regard to the coefficient C5 and the coefficient C4 generated at the decomposition level=2, in the region LL at the decomposition level=1, one line based on the coefficient C5 is disposed in the region LL, and one line based on the coefficient C4 is disposed in each of the region HH, the region HL, and the region LH.

In a second filtering process and thereafter using the wavelet transform unit 151, a filtering process is performed in increments of four lines (In-2 . . . in A of FIG. 6). Coefficient data of every two lines is generated at the decomposition level=1 (WT-2 in B of FIG. 6), and coefficient data of every line is generated at the decomposition level=2.

At the second time in the example in FIG. 5, items of coefficient data equivalent to two lines, the coefficient C6 and the coefficient C7, are generated with a filtering process at the decomposition level=1, and, as shown in an example in B of FIG. 6, are disposed, starting with the next item of the coefficient data generated with the first filtering process, in the region HH, the region HL, and the region LH formed at the decomposition level 1. Similarly, in the region LL based on the decomposition level=1, the coefficient C9 which is equivalent to one line and generated with the filtering process at the decomposition level=2 is disposed in the region LL, and the coefficient C8 equivalent to one line is disposed in each of the region HH, the region HL, and the region LH.

As in B of FIG. 6, when wavelet-transformed data is decoded, as shown in an example in C of FIG. 6, the first line is output by performing the first combining process on the decoding side (Out-1 in C of FIG. 6), which corresponds to the first filtering process based on the first line through the seventh line on the encoding side. Thereafter, four lines are output at a time on the decoding side (Out-2 . . . in C of FIG. 6), which corresponds to the second through one before the last filtering processes on the encoding side. Subsequently, eight lines are output on the decoding side, which corresponds to the last filtering process on the encoding side.

Items of coefficient data generated from the high frequency component side to the low frequency component side at the wavelet transform unit 151 are sequentially stored in the coefficient reordering buffer unit 153. When as many items of coefficient data as are needed to enable the above-described reordering of coefficient data are accumulated in the coefficient reordering buffer unit 153, the coefficient reordering unit 154 reorders the items of coefficient data in order of items needed in a combining process and reads out the items of coefficient data from the coefficient reordering buffer unit 153. The read-out items of coefficient data are sequentially supplied to the entropy coding unit 155.

The entropy coding unit 155 sequentially encodes the supplied coefficient data and outputs the generated encoded data to the outside of the encoding unit 113.

Figure 7:
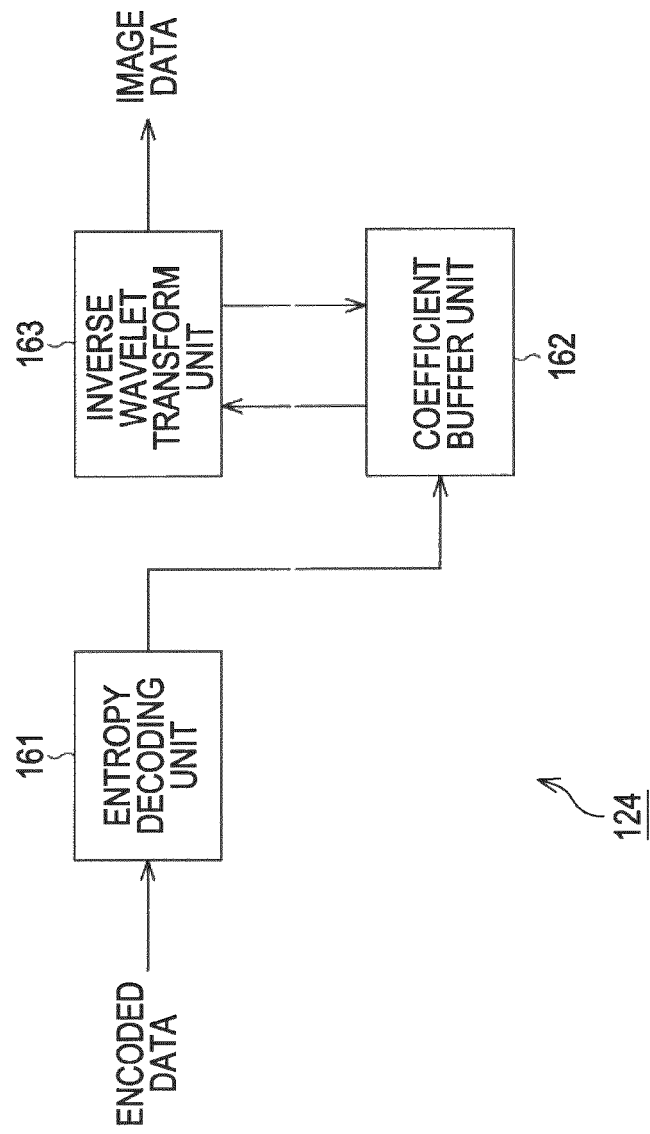
FIG. 7 is a block diagram showing an exemplary structure of a decoding unit in FIG. 1.

FIG. 7 is a block diagram showing an exemplary structure of the decoding unit 124 in FIG. 1.

As shown in FIG. 7, the decoding unit 124 includes functions of an entropy decoding unit 161, a coefficient buffer unit 162, and an inverse wavelet transform unit 163.

The entropy decoding unit 161 decodes the supplied encoded data using a decoding method corresponding to the encoding method performed by the entropy coding unit 155 (FIG. 2) to obtain coefficient data. The generated coefficient data is stored in the coefficient buffer unit 162. The inverse wavelet transform unit 163 uses the coefficient data stored in the coefficient buffer unit 162 to perform a combining filtering process (inverse wavelet transform) using combining filters and again stores the result of the combining filtering process in the coefficient buffer unit 162. When the inverse wavelet transform unit 163 repeats this process in accordance with a decomposition level and obtains decoded image data (output image data), the inverse wavelet transform unit 163 outputs this to the outside.

Figure 8:
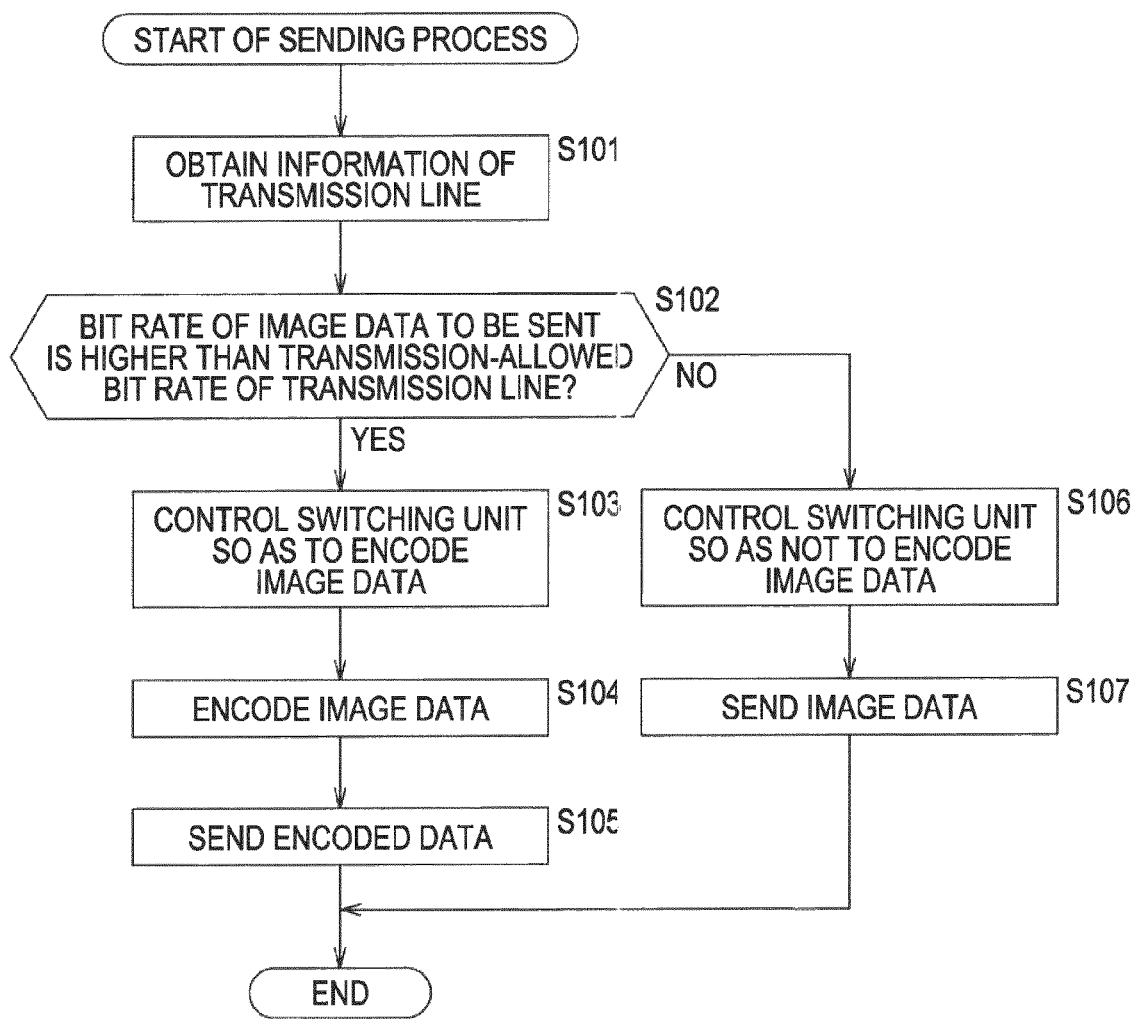
FIG. 8 is a flowchart for describing an exemplary flow of a sending process.

Next, with reference to the flowchart in FIG. 8, an exemplary flow of a sending process executed by the sending apparatus 101 in FIG. 1 will be described.

When the sending process starts, in step S101, the control unit 111 obtains information of the transmission line 103, that is, information indicating the performance as the transmission line 103 of a network (or cable) connected as the transmission line 103 to the communication unit 114, from the communication unit 114. For example, when a network (or cable) whose performance is known has been connected, this may be information indicating the type of the network (or cable).

Note that, when the communication unit 114 is connectable to only one specific type of network (or cable), it is only necessary for the communication unit 114 to provide information regarding the predetermined network (or cable) to the control unit 111. When the communication unit 114 has a plurality of types of ports and is connectable to a plurality of types of networks (or cables), the communication unit 114 identifies the currently connected transmission line 103 and provides information regarding this transmission line 103.

When the control unit 111 obtains the information of the transmission line 103, the control unit 111 determines in step S102 whether or not the bit rate of image data to be sent is higher than the transmission-allowed bit rate of the transmission line 103, that is, the maximum bit rate at which transmission can be performed. When it is determined that the bit rate of image data to be sent is higher and it is thus impossible to transmit the image data as it is as baseband data, the control unit 111 advances the process to step S103.

In step S103, the control unit 111 supplies the input image data to the encoding unit 113 and controls the switching unit 112 so as to encode the image data in the encoding unit 113. In step S104, under control of the control unit 111, the encoding unit 113 encodes the baseband image data supplied via the switching unit 112 to generate encoded data and reduces the bit rate of data to be transmitted. In step S105, the communication unit 114 sends the encoded data, which is obtained by encoding performed by the encoding unit 113, to the receiving apparatus 102 via the transmission line 103, and terminates the sending process.

Alternatively, when it is determined in step S102 that the bit rate of image data to be sent is lower than the transmission-allowed bit rate, the image data can be transmitted as it is as baseband data. Accordingly, the control unit 111 advances the process to step S106 and controls the switching unit 112 so as not to supply the input image data to the encoding unit 113. Under control thereof, the switching unit 112 supplies the input baseband image data to the communication unit 114. In step S107, the communication unit 114 sends the baseband image data, which has been supplied from the switching unit 112, to the receiving apparatus 102 via the transmission line 103, and terminates the sending process.

Next, with reference to the flowchart in FIG. 9, an exemplary flow of the encoding process executed in step S104 in FIG. 8 will be described.

When the encoding process starts, the wavelet transform unit 151 in the encoding unit 113 initializes in step S121 the numeral A of a precinct to be processed. For example, the numeral A is set to "1". When the setting is completed, the wavelet transform unit 151 obtains in step S122 image data equivalent to a number of lines (that is, one precinct) needed to generate an A-th line from the top in the lowest frequency sub-bands. In step S123, the wavelet transform unit 151 performs, for that image data, a vertical analysis filtering process of performing analysis filtering of the image data arranged in the screen vertical direction, and, in step S124, performs a horizontal analysis filtering process of performing an analysis filtering process of the image data arranged in the screen horizontal direction.

In step S125, the wavelet transform unit 151 determines whether or not the analysis filtering processes have been performed up to the final level. When it is determined that the decomposition level has not reached a final level, the process returns to step S123, and the analysis filtering processes in step S123 and step S124 are repeated for the current decomposition level.

When it is determined in step S125 that the analysis filtering processes have been performed up to the final level, the process proceeds to step S126.

In step S126, the coefficient reordering unit 154 reorders coefficients of the precinct A (A-th precinct from the top of the picture (frame or field)) in order of low frequency to high frequency. In step S127, the entropy coding unit 55 performs entropy coding of the coefficients in increments of a line.

In step S128, the wavelet transform unit 151 increments the value of the numeral A by "1" to have the next precinct to be processed. In step S129, it is determined whether or not an unprocessed image input line exists in the picture (frame or field) to be processed. When it is determined that an unprocessed image input line exists, the process returns to step S122, and the process thereafter is repeated on a new precinct to be processed.

As above, the processing in step S122 through step S129 is repeatedly executed, and each precinct is encoded. Subsequently, when it is determined in step S129 that no unprocessed image input line exists, the encoding process of that picture is terminated. A new encoding process starts for the next picture.

Since the wavelet transform unit 151 successively performs the vertical analysis filtering process and the horizontal analysis filtering process in this manner in increments of a precinct up to the final level, compared with a conventional method, the amount of data needed to be held (buffered) at a time (simultaneously) is small, and the amount of memory of the buffer that should be prepared can be significantly reduced. Also, since the analysis filtering processes are performed up to the final level, processes such as reordering of coefficients and entropy coding at subsequent stages can be performed (that is, reordering of coefficients and entropy coding can be performed in increments of a precinct). Therefore, the delay time can be significantly reduced, compared with a method of performing wavelet transform of the entire screen.

Also, as above, on the basis of the bit rate of image data to be transmitted and the transmission-allowed bit rate of the transmission line 103, the sending apparatus 101 can determine whether or not to compress the image data. Accordingly, the sending apparatus 101 can inhibit from unnecessarily compressing the image data or transmitting the image data as it is as baseband image data at a bit rate at which transmission cannot be performed. Therefore, the sending apparatus 101 can transmit image data with high quality and low delay in more versatile situations.

Figure 10:
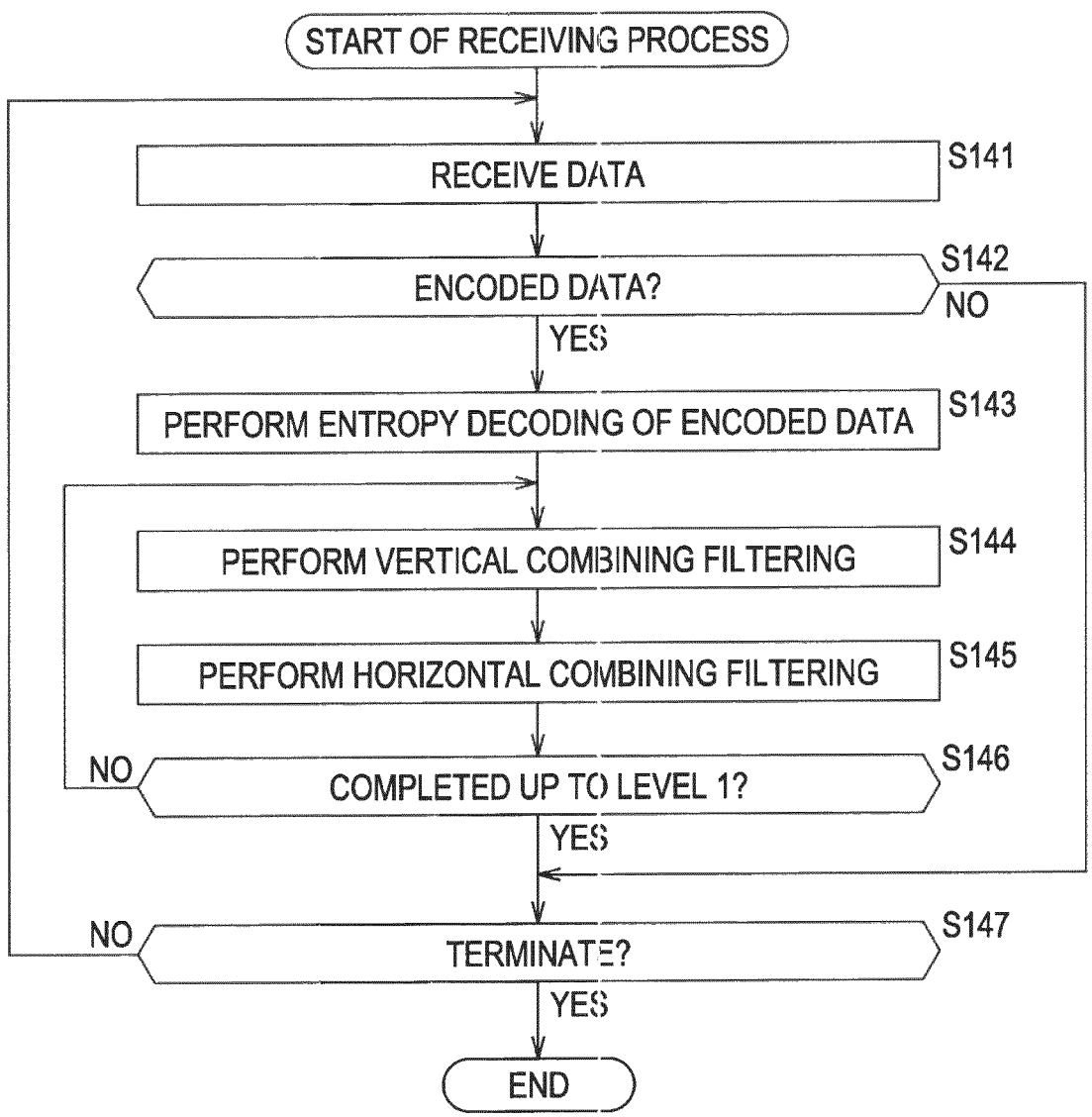
FIG. 10 is a flowchart for describing an exemplary flow of a receiving process.

Next, with reference to the flowchart in FIG. 10, an exemplary flow of a receiving process executed by the receiving apparatus 102 in FIG. 1 will be described.

When the receiving process starts, in step S141, the communication unit 122 is controlled by the control unit 121 and receives data sent from the sending apparatus 101. In step S142, the communication unit 122 determines whether or not the received data is encoded data. When it is determined that the received data is encoded data, the communication unit 122 omits the processing in step S143.

In step S143, the entropy decoding unit 161 in the decoding unit 124 performs entropy decoding of the encoded data. In step S144, the inverse wavelet transform unit 163 performs vertical combining filtering of coefficient data. In step S145, the inverse wavelet transform unit 163 performs horizontal combining filtering of the coefficient data. In step S146, the inverse wavelet transform unit 163 determines whether or not the combining filtering has been completed up to level 1. When it is determined that the combining filtering has not been completed, the process returns to step S144, and the combining filtering is continued. When it is determined that the combining filtering has been completed up to level 1, the process proceeds to step S147.

Alternatively, when it is determined in step S142 that the received data is baseband image data, the communication unit 122 advances the process to step S147.

In step S147, the control unit 121 determines whether or not to terminate the receiving process. When it is determined not to terminate the receiving process, the process returns to step S141, and the process thereafter is repeated. Alternatively, when it is determined in step S147 to terminate the receiving process, the control unit 121 terminates the receiving process.

As above, the receiving apparatus 102 can receive data and perform a decoding process according to need. Therefore, the receiving apparatus 102 can receive image data with high quality and low delay in more versatile situations.

Figure 11:
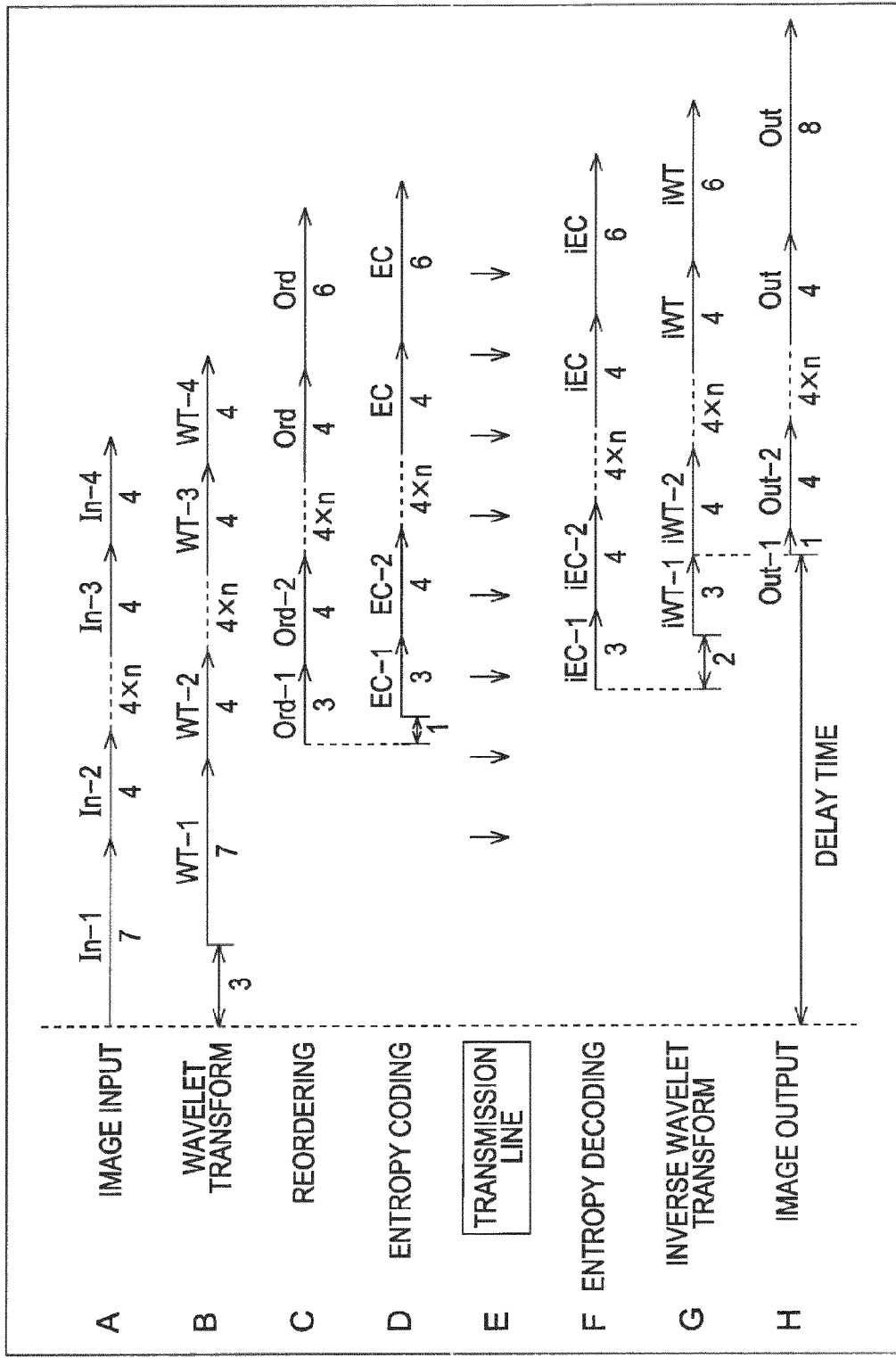
FIG. 11 is an outline diagram showing the outline of an example of the manner of parallel operation performed by individual elements of the encoding unit and the decoding unit.

Various processes as described above may appropriately be executed in parallel, as shown in FIG. 11 by way of example.

FIG. 11 is a diagram showing the outline of an example of the parallel operation of individual elements of processes executed by the individual units of the encoding unit 113 shown in FIG. 2 and the decoding unit 124 shown in FIG. 7. This FIG. 11 corresponds to FIG. 5 and FIG. 6 described above. A first wavelet transform WT-1 (B in FIG. 11) is applied to an input In-1 of image data (A in FIG. 11) at the wavelet transform unit 151 (FIG. 2). As has been described with reference to FIG. 5, this first wavelet transform WT-1 is started at a point of time at which the first three lines are input, and the coefficient C1 is generated. That is, a delay equivalent to three lines occurs from the input of the image data In-1 until the start of the wavelet transform WT-1.

The generated coefficient data is stored in the coefficient reordering buffer unit 153 (FIG. 2). Subsequently, the wavelet transform is applied to the input image data, and, when the first process is completed, the process directly proceeds to a second wavelet transform WT-2.

In parallel to an input of image data In-2 for the second wavelet transform WT-2 and a process of the second wavelet transform WT-2, reordering Ord-1 of three, the coefficient C1, the coefficient C4, and the coefficient C5, is executed by the coefficient reordering unit 154 (FIG. 2) (C in FIG. 11).

Note that the delay from the completion of the wavelet transform WT-1 until the start of the reordering Ord-1 is a delay based on the apparatus or system configuration, such as a delay involved in transmission of a control signal for instructing the coefficient reordering unit 154 to perform a reordering process, a delay required to start a process performed by the coefficient reordering unit 154 in response to the control signal, and a delay required for program processing, and is not an essential delay involved in an encoding process.

Items of coefficient data are read out from the coefficient reordering buffer unit 153 in the order in which they are finished being reordered and are supplied to the entropy coding unit 155 (FIG. 2), and entropy coding EC-1 thereof is performed (D in FIG. 11). This entropy coding EC-1 can be started without waiting for completion of the reordering of all the three, the coefficient C1, the coefficient C4, and the coefficient C5. For example, at a point of time at which reordering of one line based on the coefficient C5 which is output first is completed, entropy coding of the coefficient C5 can be started. In this case, a delay from the start of the process of the reordering Ord-1 to the start of the process of the entropy coding EC-1 is equivalent to one line.

Predetermined signal processing is applied to the encoded data of which the entropy coding EC-1 by the entropy coding unit 155 has been completed, and then transmitted to the decoding unit 124 (FIG. 7) (E in FIG. 11).

As above, in succession to input of image data equivalent to seven lines with the first process, items of image data up to the lower end line of the screen are sequentially input to the encoding unit 113. In accordance with an input In-n (n is 2 or greater) of image data, the encoding unit 113 performs wavelet transform WT-n, reordering Ord-n, and entropy coding EC-n every four lines, as described above. Reordering Ord and entropy coding EC in the encoding unit 113 in response to the last process are performed on six lines. These processes are performed in parallel in the encoding unit 113, as illustrated in A in FIG. 11 through D in FIG. 11.

Encoded data encoded by performing entropy coding EC-1 using the encoding unit 113 is supplied to the decoding unit 124. The entropy decoding unit 161 (FIG. 7) in the decoding unit 124 sequentially performs decoding iEC-1 of entropy coding of the encoded data encoded with the entropy coding EC-1, which is supplied thereto, and restores the coefficient data (F in FIG. 11). Items of restored coefficient data are sequentially stored in the coefficient buffer unit 162. When as many items of coefficient data as are needed to perform inverse wavelet transform are stored in the coefficient buffer unit 162, the inverse wavelet transform unit 163 reads out the coefficient data from the coefficient buffer unit 162 and performs inverse wavelet transform iWT-1 using the read-out coefficient data (G in FIG. 11).

As has been described with reference to FIG. 5, the inverse wavelet transform iWT-1 performed by the inverse wavelet transform unit 163 can be started at a point of time at which the coefficient C4 and the coefficient C5 are stored in the coefficient buffer unit 162. Therefore, a delay from the start of the decoding iEC-1 performed by the entropy decoding unit 161 to the start of the inverse wavelet transform iWT-1 performed by the inverse wavelet transform unit 163 is equivalent to two lines.

When the inverse wavelet transform iWT-1 equivalent to three lines of the first wavelet transform is completed in the inverse wavelet transform unit 163, an output Out-1 of image data generated with the inverse wavelet transform iWT-1 is performed (H in FIG. 11). In the output Out-1, as has been described using FIG. 5 and FIG. 6, image data of the first line is output.

In succession to input of encoded coefficient data equivalent to three lines with the first process performed by the encoding unit 113, items of coefficient data encoded with entropy coding EC-n (n is 2 or greater) are sequentially input to the decoding unit 124. The decoding unit 124 performs entropy decoding iEC-n and inverse wavelet transform iWT-n of the input coefficient data every four lines and sequentially performs an output Out-n of image data restored with the inverse wavelet transform iWT-n, as has been described above. Entropy decoding iEC and inverse wavelet transform iWT in response to the last time performed by the encoding unit 113 are performed on six lines, and an output Out outputs eight lines. These processes are performed in parallel in the decoding unit 124, as illustrated in F in FIG. 11 through H in FIG. 11.

By performing the individual processes in the encoding unit 113 and the decoding unit 124 in parallel in order from the upper portion to the lower portion of the screen as has been described above, an image compression process and an image decoding process can be performed with a shorter delay.

Referring to FIG. 11, a delay time from an image input to an image output in the case where wavelet transform up to the decomposition level=2 is performed using a 5×3 filter is calculated. A delay time from when image data of the first line is input to the encoding unit 113 to when the image data of the first line is output from the decoding unit 124 is the sum total of the following individual elements. Note that a delay that is different depending on the system configuration, such as a delay in transmission line or a delay involved in the actual processing timing of each unit of the apparatus, is excluded here.

(1) Delay $D_{13}$ WT from the first line input to the completion of the wavelet transform WT-1 equivalent to seven lines (2) Time D_Ord involved in coefficient reordering Ord-1 equivalent to three lines (3) Time D_EC involved in entropy coding EC-1 equivalent to three lines (4) Time D_iEC involved in entropy decoding iEC-1 equivalent to three lines (5) Time D_iWT involved in inverse wavelet transform iWT-1 equivalent to three lines Referring to FIG. 11, a calculation of delay due to the individual elements described above is attempted. The delay D_WT in (1) is a time equivalent to ten lines. Each of the time D_Ord in (2), the time D_EC in (3), the time D_iEC in (4), and the time D_iWT in (5) is a time equivalent to three lines. Also, the entropy coding EC-1 can be started in an encoding unit 155 one line after the reordering Ord-1 is started. Similarly, the inverse wavelet transform iWT-1 can be started in a decoding unit 161 two lines after the entropy decoding iEC-1 is started. Also, the entropy decoding iEC-1 can start a process at a point of time at which encoding equivalent to one line is completed in the entropy coding EC-1.

Therefore, in the example in FIG. 11, a delay time from the input of the image data of the first line to the encoding unit 113 to the output of the image data of the first line from the decoding unit 124 is equivalent to 10+1+1+2+3=17 lines.

Using a more specific example, a delay time will be considered. In the case where input image data is an interlaced video signal based on HDTV (High Definition Television), for example, one frame is configured of a resolution of 1920 pixels×1080 lines, and one field is of 1920 pixels×540 lines. Therefore, when a frame frequency is assumed to be 30 Hz, 540 lines serving as one field are input to the encoding unit 113 during a time of 16.67 msec (=1 sec/60 fields).

Therefore, a delay time involved in an input of image data equivalent to seven lines is 0.216 msec (=16.67 msec×lines), which is a very short time with respect to an updating time of one field, for example. Also, with regard to the sum total of the above-described delay D_WT in (1), time D_Ord in (2), time D_EC in (3), time D_iEC in (4), and time D_iWT in (5) as well, the number of lines to be processed is small, and accordingly a delay time is extremely reduced.

In the above, it has been described that encoding of image data is controlled on the basis of the high/low relationship between the transmission-allowed bit rate of the transmission line 103 and the bit rate of image data to be sent. Alternatively, for example, by actually measuring the bandwidth of the transmission line 103 between the sending apparatus 101 and the receiving apparatus 102 before transmitting image data, whether or not to encode image data in the sending apparatus 101 may be controlled not using the transmission-allowed bit rate of the transmission line 103 as a standard, but using the actual transmission-allowed bit rate (measured value) at that point of time.

Note that, in order to do this, the standard of the transmission line 103 is required to support information exchange between the sending apparatus 101 and the receiving apparatus 102 before image data transmission. Also, on the assumption that image data is to be encoded, the measured value may serve as the bit rate of the encoded data. That is, the sending apparatus 101 may perform encoding of image data using the measured value as a target bit rate. For example, when the transmission line 103 is shared with another system or the like, the available bandwidth of the transmission line 103 may change with time or situation. When this available bandwidth is narrow, the bit rate is limited to be low. When the available bandwidth has some margin, the bit rate is increased, for example. By controlling the bit rate of encoded data in accordance with the available bandwidth of the transmission line 103, the transmission system 100 can transmit image data with high quality and low delay in more versatile situations.

Also, using the function of exchanging information between the sending apparatus 101 and the receiving apparatus 102 before the image data transmission, the receiving apparatus 102 may provide information regarding the performance (including the sense "actually required performance") of the receiving apparatus 102 to the sending apparatus 101. For example, the sending apparatus 101 may control whether or not to encode image data depending on whether or not the receiving apparatus 102 has the decoding unit 124 corresponding to the encoding unit 113.

Further, in the case of the assumption that the sending apparatus 101 encodes image data and transmits the encoded image data to the receiving apparatus 102, the sending apparatus 101 may perform settings of an encoding process, such as the resolution, the bit rate, and the delay time, on the basis of information regarding the performance of the receiving apparatus 102.

For example, it is conceivable in some cases that the resolution of an image at the time of output from the receiving apparatus 102 is lower than the resolution of an image at the time of input to the sending apparatus 101, such as the case where the resolution of an image that can be displayed on a display device displaying an image output from the receiving apparatus 102 is low. In such a case, when encoded data of an image with a high resolution is output from the sending apparatus 101, not only the band of the transmission line 103 is unnecessarily occupied, but also an unnecessary load may be placed on the receiving apparatus 102, which is meaningless. Further, for example, when there is a limit to delay time of the entire transmission system 100, depending on delay time in a decoding process, it is conceivable that it is necessary to limit the allowable delay time in an encoding process.

Therefore, when information regarding the performance of the receiving apparatus 102 is supplied to the sending apparatus 101 before image data transmission and the sending apparatus 101 performs settings of an encoding process on the basis of that information, the sending apparatus 101 can more appropriately perform an encoding process. That is, the transmission system 100 can transmit image data with high quality and low delay in more versatile situations.

HDMI exists as an example of the transmission line 103 having a negotiation function between the sending apparatus 101 and the receiving apparatus 102 before transmitting such image data. Hereinafter, the HDMI will be described. In the following description, it is assumed that the transmission line 103 is an HDMI cable (may also be referred to as an HDMI cable 103).

The communication unit 114 (HDMI sending unit) of the sending apparatus 101 reads out, via the HDMI cable 103, from the communication unit 122 (HDMI receiving unit) of the receiving apparatus 102, E-EDID (Enhanced Extended Display Identification Data) of the communication unit 122 via a DDC (Display Data Channel). This E-EDID includes information regarding the performance of the receiving apparatus 102, such as the resolution handled in the receiving apparatus 102, delay time in a decoding process, bit depth, and frame rate.

Figure 12:
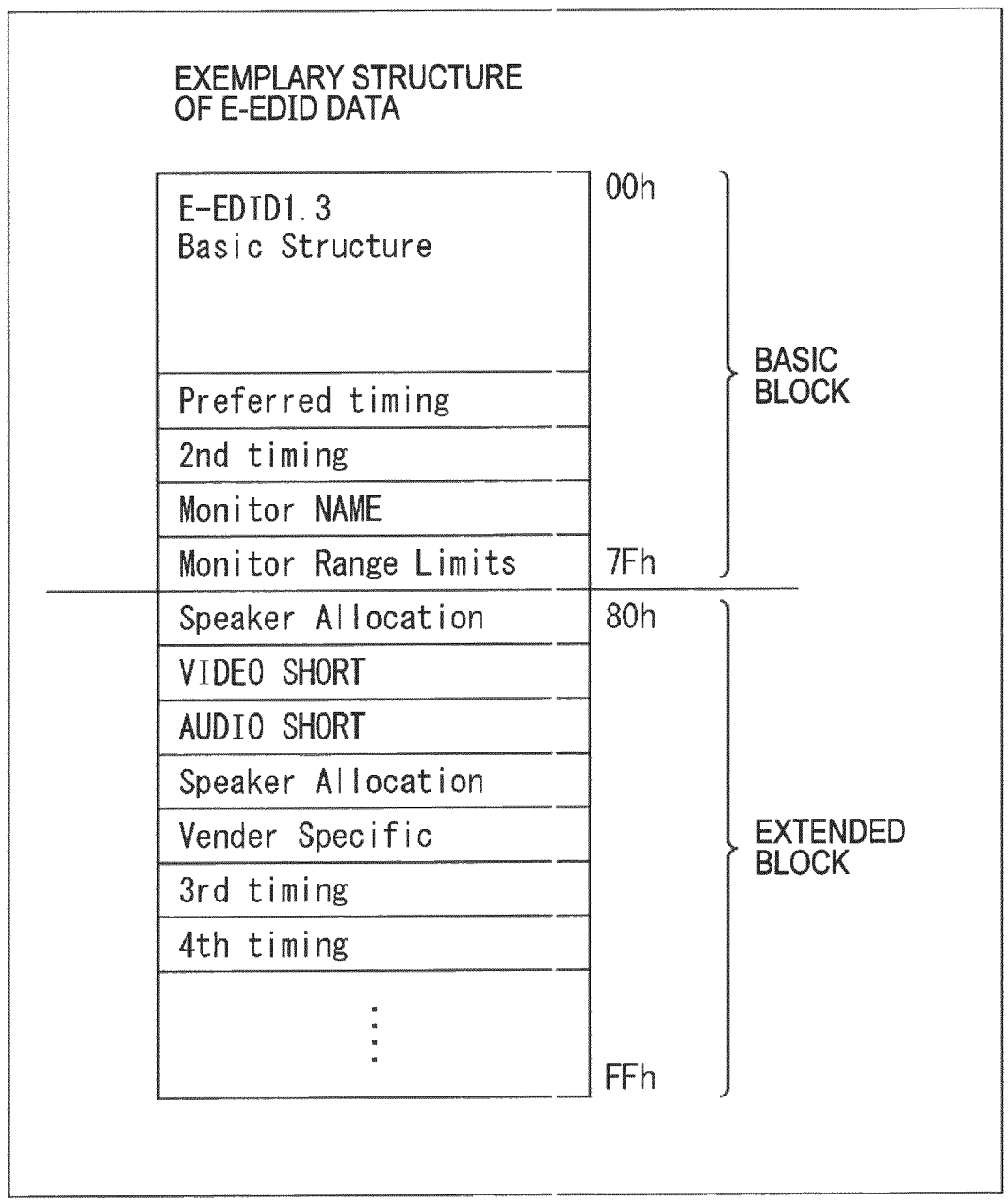
FIG. 12 is a diagram showing an exemplary structure of E-EDID data.

FIG. 12 shows an exemplary data structure of E-EDID. This E-EDID consists of a basic block and an extended block. At the head of the basic block, data that is represented as "E-EDID1.3 Basic Structure" and is defined in the E-EDID 1.3 standard is placed. Subsequently, timing information that is represented as "Preferred timing" and is for keeping compatibility with known EDID, and timing information that is represented as "2nd timing", is different from "Preferred timing", and is for keeping compatibility with known EDID are placed.

Also in the basic block, after "2nd timing", information that is represented as "Monitor NAME" and indicates the name of a display device, and information that is represented as "Monitor Range Limits" and indicates the number of displayable pixels when the aspect ratio is 4:3 and 16:9 are sequentially placed.

At the head of the extended block, information that is represented as "Speaker Allocation" and is regarding left and right loudspeakers is placed. Subsequently, data that is represented as "VIDEO SHORT" and describes information such as the displayable image size (resolution), the frame rate, information indicating whether the mode is interlaced or progressive, and the aspect ratio, data that is represented as "AUDIO SHORT" and describes information such as the audio codec scheme that can be reproduced, the sampling frequency, the cut-off band, and the number of bits of the codec, and information that is represented as "Speaker Allocation" and is regarding the left and right loudspeakers are sequentially placed.

Also in the extended block, after "Speaker Allocation", data that is represented as "Vender Specific" and is uniquely defined for each manufacturer, timing information that is represented as "3rd timing" and is for keeping compatibility with known EDID, and timing information that is represented as "4th timing" and is for keeping compatibility with known EDID are placed.

FIG. 13 shows an example of video data in the VIDEO SHORT region. From Byte#1 to Byte#L in the VIDEO SHORT region, among video signal formats defined by the standard called CEA (Consumer Electronics Association)-861-D, a format that can be processed by the receiving apparatus 102 is represented as a combination of the resolution, the frame rate, and the aspect ratio.

FIG. 14 shows an exemplary data structure in the Vender Specific region. In this Vender Specific region, a 0-th block through an N-th block which are 1-byte blocks are provided.

In the 0-th block placed at the head of data represented as "Vender Specific", a header which is represented as "Vendor- Specific tag code(=3)" and indicates a data region of the data "Vender Specific", and information which is represented as "Length(=N)" and indicates the length of the data "Vender Specific" are placed.

Also, in the first block through the third block, information represented as "24 bit IEEE Registration Identifier (0x000 C03) LSB first" and indicates the number "0x000 C03" registered for HDMI(R) is placed. Further, in the fourth block and the fifth block, items of information that are represented as "A", "B", "C", and "D", respectively, and indicate physical addresses of a 24-bit sink device are placed.

In the sixth block, a flag that is represented as "Supports-AI" and indicates a function supported by the sink device, items of information that are represented as "DC-48 bit", "DC-36 bit", and "DC-30 bit", respectively, and specify the number of bits per pixel, a flag that is represented as "DC-Y444" and indicates whether the sink device supports transmission of a YCbCr 4:4:4 image, and a flag that is represented as "DVI-Dual" and indicates whether the sink device supports dual DVI (DIGITAL Visual Interface) are placed.

Also, in the seventh block, information that is represented as "Max-TMDS-Clock" and indicates the maximum frequency of a pixel clock of TMDS (Transition Minimized Differential Signaling) is placed. Further, in the eighth block, a flag that is represented as "Latency" and indicates the presence/absence of delay information of video and audio is placed. Also, in the ninth block, delay time data that is represented as "Video Latency" and is of progressive video is placed. In the tenth block, delay time data that is represented as "Audio Latency" and is of audio accompanying the progressive video is placed. Further, in the eleventh block, delay time data that is represented as "Interlaced Video Latency" and is of interlaced video is placed. In the twelfth block, delay time data that is represented as "Interlaced Audio Latency" and is of audio accompanying the interlaced video is placed.

For example, by setting the "Latency" flag in the eighth block and writing data of the actual delay time in "Video Latency" in the ninth block, delay time of the decoding unit 124 can be provided to the encoding unit 113. Also, in the case where an image is in the interlaced format, data of the actual delay time may be written in "Interlaced Video Latency" in the eleventh block.

Figure 15:
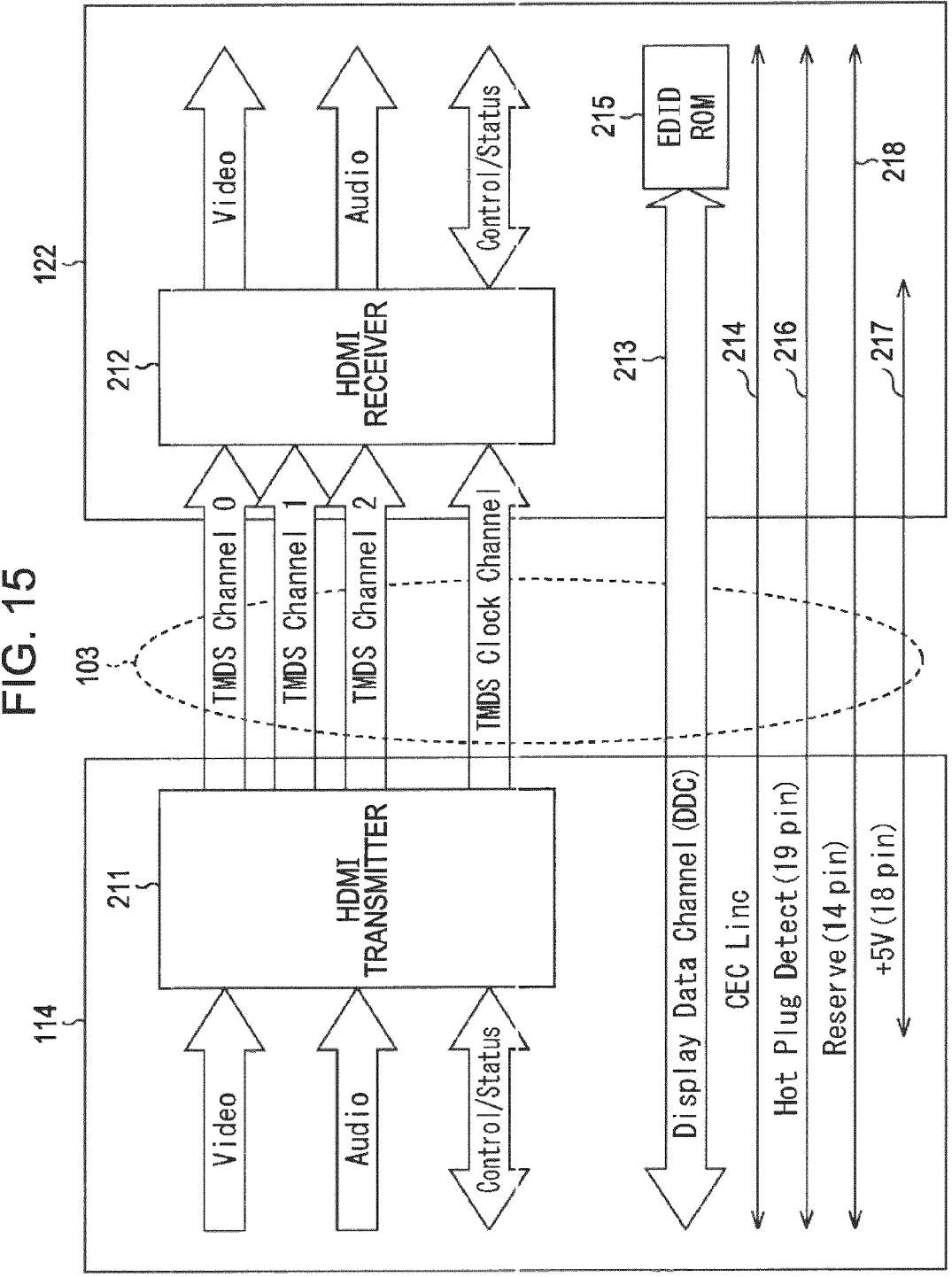
FIG. 15 is a block diagram showing exemplary structures of communication units.

Next, the communication unit 114 (HDMI sending unit) of the sending apparatus 101 and the communication unit 122 (HDMI receiving unit) of the receiving apparatus 102 will be described. FIG. 15 is a block diagram showing detailed exemplary structures of the communication unit 114 and the communication unit 122.

The communication unit 114 which is the HDMI sending unit sends, in an effective image section which is a section obtained by excluding a horizontal blanking section and a vertical blanking section from a section from one vertical synchronization signal to the next vertical synchronization signal (hereinafter may also be referred to as an active video section according to need), a differential signal corresponding to pixel data of an image equivalent to one non-compressed screen in a unidirectional manner using a plurality of channels to the communication unit 122 which is the HDMI receiving unit. Additionally, in the horizontal blanking section or the vertical blanking section, the communication unit 114 at least sends differential signals corresponding to audio data accompanying the image, control data, and other auxiliary data in a unidirectional manner using the plurality of channels to the communication unit 122.

That is, the communication unit 114 includes an HDMI transmitter 211. The HDMI transmitter 211 converts, for example, encoded data into a corresponding differential signal and serially transmits the differential signal in a unidirectional manner using three TMDS channels #0, #1, and #2 which are the plurality of channels to the communication unit 122 connected thereto via the HDMI cable 103.

Also, the HDMI transmitter 211 converts audio data accompanying the encoded data, and further, necessary control data, other auxiliary data, and the like into corresponding differential signals and serially transmits the differential signals in a unidirectional manner using the three TMDS channels #0, #1, and #2 to the communication unit 122 connected thereto via the HDMI cable 103.

Further, the HDMI transmitter 211 sends a pixel clock synchronized with pixel data, which is to be sent using the three TMDS channels #0, #1, and #2, using a TMDS clock channel to the communication unit 122 connected thereto via the HDMI cable 103. Here, with one TMDS channel #i (i=0, 1, 2), for example, 10-bit data is sent during one clock of the pixel clock.

In the active video section, the communication unit 122 receives the differential signal corresponding to the pixel data, which has been sent using the plurality of channels in a unidirectional manner from the communication unit 114. Additionally, in the horizontal blanking section or the vertical blanking section, the communication unit 122 receives the differential signals corresponding to the audio data and the control data, which have been sent using the plurality of channels in a unidirectional manner from the communication unit 114.

That is, the communication unit 122 includes an HDMI receiver 212. The HDMI receiver 212 receives the differential signal corresponding to the pixel data and the differential signals corresponding to the audio data and the control data, which have been sent using the TMDS channels #0, #1, and #2 in a unidirectional manner from the communication unit 114 connected thereto via the HDMI cable 103, in synchronization with the pixel block which is also sent from the communication unit 114 using the TMDS clock channel.

Transmission channels in the HDMI system including the communication unit 114 and the communication unit 122 include, besides the three TMDS channels #0 to #2 serving as transmission channels for serially transmitting encoded data and audio data in a unidirectional manner from the communication unit 114 to the communication unit 122 in synchronization with the pixel clock and the TMDS clock channel serving as a transmission channel that transmits the pixel clock, transmission channels called a DDC (Display Data Channel) 213 and a CEC line 214.

The DDC 213 consists of two signal lines that are included in the HDMI cable 103 and are not shown in the drawings. The DDC 213 is used for the communication unit to read out E-EDID from the communication unit 122 connected thereto via the HDMI cable 103.

That is, the communication unit 122 includes, besides the HDMI receiver 212, an EDID ROM (Read Only Memory) 215 storing E-EDID which is performance information regarding the performance (Configuration/capability) of itself. The communication unit 114 reads out E-EDID of the communication unit 122 via the DDC 213 from the communication unit 122 connected thereto via the HDMI cable 103 and, on the basis of this E-EDID, recognizes, for example, the format (profile) of an image supported by an electronic device including the communication unit 122, such as RGB, YCbCr 4:4:4, YCbCr 4:2:2, or YCbCr 4:2:0.

The CEC line 214 consists of one signal line that is included in the HDMI cable 103 and is not shown in the drawings. The CEC line 214 is used for performing bidirectional communication of control data between the communication unit 114 and the communication unit 122.

Also, the HDMI cable 103 includes a line 216 to be connected to a pin called an HPD (Hot Plug Detect). A source device can detect connection of a sink device using this line 216. Also, the HDMI cable 103 includes a line 217 used for supplying power from the source device to the sink device. Further, the HDMI cable 103 includes a reserved line 218 for extension.

Figure 16:
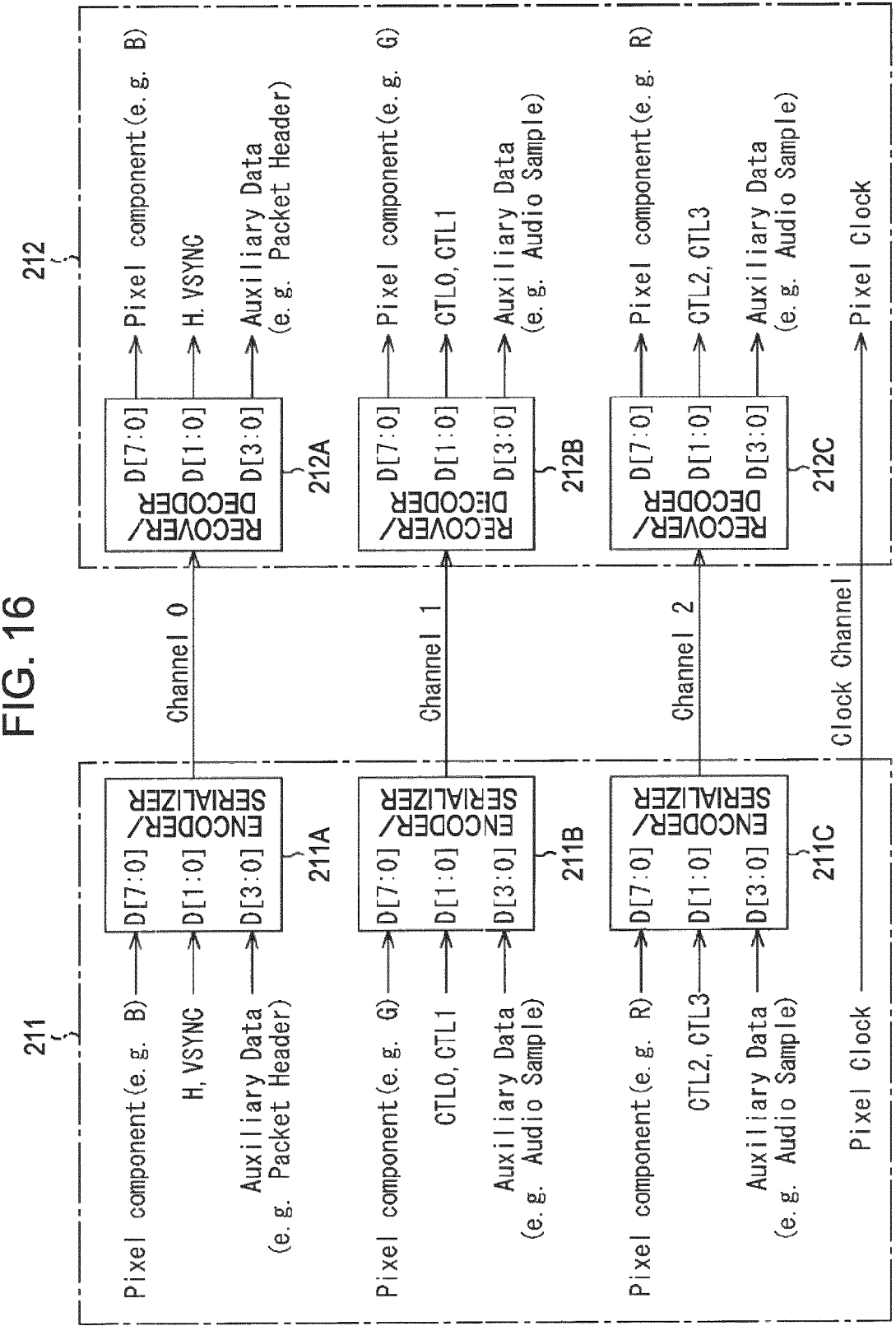
FIG. 16 is a block diagram showing exemplary structures of an HDMI transmitter and an HDMI receiver.

FIG. 16 shows exemplary structures of the HDMI transmitter 211 and the HDMI receiver 212 in FIG. 15.

The HDMI transmitter 211 includes three encoders/serializers 211A, 211B, and 211C corresponding to the three TMDS channels #0, #1, and #2, respectively. Each of the encoders/serializers 211A, 211B, and 211C encodes image data, auxiliary data, and control data supplied thereto, converts the supplied data from parallel data into serial data, and sends the serial data as differential signals. Here, when image data has, for example, three components R (red), G (green), and B (blue), the B component is supplied to the encoder/serializer 211A; the G component is supplied to the encoder/serializer 211B; and the R component is supplied to the encoder/serializer 211C.

Also, the auxiliary data includes, for example, audio data and control packets. The control packets are supplied to, for example, the encoder/serializer 211A, and the audio data is supplied to the encoders/serializers 211B and 211C.

Further, the control data includes a 1-bit vertical synchronization signal (VSYNC), a 1-bit horizontal synchronization signal (HSYNC), and 1-bit control bits CTL0, CTL1, CTL2, and CTL3. The vertical synchronization signal and the horizontal synchronization signal are supplied to the encoder/serializer 211A. The control bits CTL0 and CTL1 are supplied to the encoder/serializer 211B, and the control bits CTL2 and CTL3 are supplied to the encoder/serializer 211C.

The encoder/serializer 211A sends the B component of the image data, the vertical synchronization signal, the horizontal synchronization signal, and the auxiliary data, which are supplied thereto, in a time division manner. That is, the encoder/serializer 211A regards the B component of the image data supplied thereto as parallel data in increments of eight bits which is the fixed number of bits. Further, the encoder/serializer 211A encodes the parallel data, converts the encoded parallel data into serial data, and sends the serial data using the TMDS channel #0.

Also, the encoder/serializer 211A encodes 2-bit parallel data of the vertical synchronization signal and the horizontal synchronization signal supplied thereto, converts the encoded parallel data into serial data, and sends the serial data using the TMDS channel #0. Further, the encoder/serializer 211A regards the auxiliary data supplied thereto as parallel data in increments of four bits. Then, the encoder/serializer 211A encodes the parallel data, converts the encoded parallel data into serial data, and sends the serial data using the TMDS channel #0.

The encoder/serializer 211B sends the G component of the image data, the control bits CTL0 and CTL1, and the auxiliary data, which are supplied thereto, in a time division manner. That is, the encoder/serializer 211B regards the G component of the image data supplied thereto as parallel data in increments of eight bits which is the fixed number of bits. Further, the encoder/serializer 211B encodes the parallel data, converts the encoded parallel data into serial data, and sends the serial data using the TMDS channel #1.

Also, the encoder/serializer 211B encodes 2-bit parallel data of the control bits CTL0 and CTL1 supplied thereto, converts the encoded parallel data into serial data, and sends the serial data using the TMDS channel #1. Further, the encoder/serializer 211B regards the auxiliary data supplied thereto as parallel data in increments of four bits. Then, the encoder/serializer 211B encodes the parallel data, converts the encoded parallel data into serial data, and sends the serial data using the TMDS channel #1.

The encoder/serializer 211C sends the R component of the image data, the control bits CTL2 and CTL3, and the auxiliary data, which are supplied thereto, in a time division manner. That is, the encoder/serializer 211C regards the R component of the image data supplied thereto as parallel data in increments of eight bits which is the fixed number of bits. Further, the encoder/serializer 211C encodes the parallel data, converts the encoded parallel data into serial data, and sends the serial data using the TMDS channel #2.

Also, the encoder/serializer 211C encodes 2-bit parallel data of the control bits CTL2 and CTL3 supplied thereto, converts the encoded parallel data into serial data, and sends the serial data using the TMDS channel #2. Further, the encoder/serializer 211C regards the auxiliary data supplied thereto as parallel data in increments of four bits. Then, the encoder/serializer 211C encodes the parallel data, converts the encoded parallel data into serial data, and sends the serial data using the TMDS channel #2.

The HDMI receiver 212 includes three recovery/decoders 212A, 212B, and 212C corresponding to the three TMDS channels #0, #1, and #2, respectively. Then, the recovery/decoders 212A, 212B, and 212C receive image data, auxiliary data, and control data sent as differential signals using the TMDS channels #0, #1, and #2, respectively. Further, each of the recovery/decoders 212A, 212B, and 212C converts the image data, the auxiliary data, and the control data from serial data into parallel data, decodes the parallel data, and outputs the decoded parallel data.

That is, the recovery/decoder 212A receives the B component of the image data, the vertical synchronization signal, the horizontal synchronization signal, and the auxiliary data, which are sent as differential signals using the TMDS channel #0. Then, the recovery/decoder 212A converts the B component of the image data, the vertical synchronization signal, the horizontal synchronization signal, and the auxiliary data from serial data into parallel data, decodes the parallel data, and outputs the decoded parallel data.

The recovery/decoder 212B receives the G component of the image data, the control bits CTL0 and CTL1, and the auxiliary data, which are sent as differential signals using the TMDS channel #1. Then, the recovery/decoder 212B converts the G component of the image data, the control bits CTL0 and CTL1, and the auxiliary data from serial data into parallel data, decodes the parallel data, and outputs the decoded parallel data.

The recovery/decoder 212C receives the R component of the image data, the control bits CTL2 and CTL3, and the auxiliary data, which are sent as differential signals using the TMDS channel #2. Then, the recovery/decoder 212C converts the R component of the image data, the control bits CTL2 and CTL3, and the auxiliary data from serial data into parallel data, decodes the parallel data, and outputs the decoded parallel data.

Figure 17:
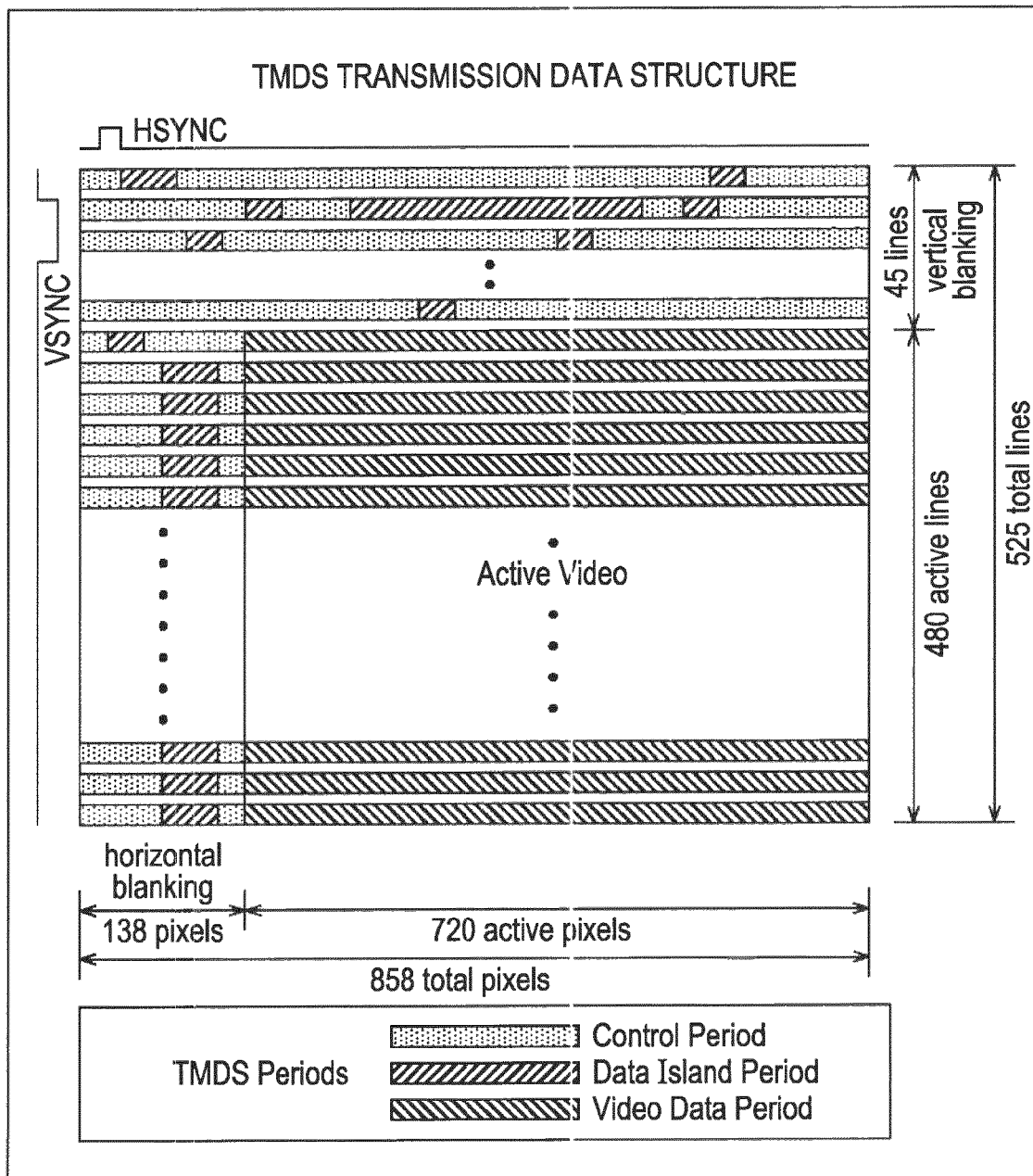
FIG. 17 is a diagram showing a structure of TMDS transmission data.

FIG. 17 shows an example of a transmission section (period) in which various items of transmission data are transmitted using the three TMDS channels #0, #1, and #2 in HDMI. Note that FIG. 17 shows sections of various items of transmission data in the case where a progressive image having 720×480 pixels as width×height is transmitted using the TMDS channels #0, #1, and #2.

In a video field in which transmission data is transmitted using the three TMDS channels #0, #1, and #2 in HDMI, according to the type of transmission data, three types of sections exist: video data sections (VideoData period), data island sections (Data Island period), and control sections (Control period).

Here, the video field section is a section from the active edge of a vertical synchronization signal to the active edge of the next vertical synchronization signal. The video field section can be divided into active video sections (Active Video) which are sections obtained by excluding, from a horizontal blanking period (horizontal blanking), a vertical blanking period (verticalblanking), and the video field section, the horizontal blanking period and the vertical blanking period.

The video data sections are allocated to the active video sections. In the video data sections, data of active pixels equivalent to 720 pixels×480 lines constituting image data equivalent to one non-compressed screen, or data obtained by compressing this, is transmitted.

The data island sections and the control sections are allocated to the horizontal blanking period and the vertical blanking period. In the data island sections and the control sections, auxiliary data is transmitted.

That is, the data island sections are allocated to portions of the horizontal blanking period and the vertical blanking period. In the data island sections, of the auxiliary data, data that does not relate to control, such as a packet of audio data, is transmitted.

The control sections are allocated to other portions of the horizontal blanking period and the vertical blanking period. In the control sections, of the auxiliary data, data that relates to control, such as a vertical synchronization signal, a horizontal synchronization signal, and a control packet, is transmitted.

Here, in the current HDMI, the frequency of a pixel clock transmitted using the TMDS clock channel is, for example, 165 MHz. In this case, the transmission rate of the data island sections is approximately 500 Mbps.

FIG. 18 shows a pin arrangement of HDMI terminals 211 and 212. This pin arrangement is an example of type A (type-A).

Two lines which are differential lines through which TMDS Data#i+ and TMDS Data#i− which are differential signals of a TMDS channel #i are transmitted are connected to pins to which TMDS Data#i+ is allocated (pins whose pin numbers are 1, 4, and 7) and to pins to which TMDS Data#i− is allocated (pins whose pin numbers are 3, 6, and 9).

Also, the CEC line 214 through which a CEC signal which is control data is transmitted is connected to a pin whose pin number is 13. A pin whose pin number is 14 is an empty (Reserved) pin. Also, a line through which an SDA (Serial-Data) signal such as E-EDID is transmitted is connected to a pin whose pin number is 16. A line through which an SCL (Serial Clock) signal which is a clock signal used in achieving synchronization at the time of sending/receiving of the SDA signal is connected to a pin whose pin number is 15. The above-described DDC 213 is constituted of the line through which the SDA signal is transmitted and the line through which the SCL signal is transmitted.

Also, as has been described above, the line 216 for the source device to detect connection of the sink device is connected to a pin whose pin number is 19. Also, as has been described above, the line 217 for supplying power is connected to a pin whose pin number is 18.

Figure 19:
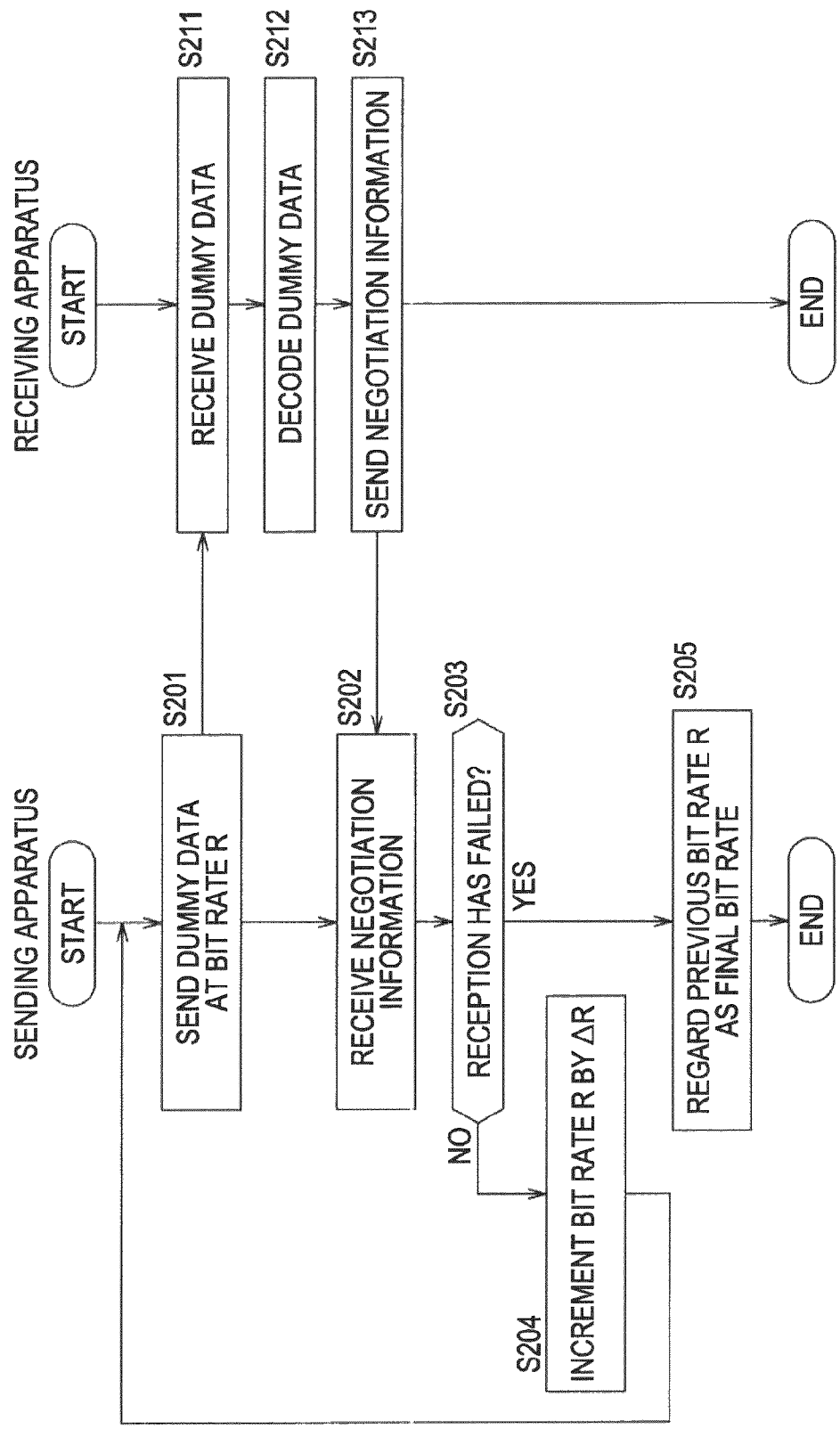
FIG. 19 is a flowchart for describing an exemplary flow of a negotiation process.

Next, with reference to the flowchart in FIG. 19, an exemplary flow of a negotiation process performed between the sending apparatus 101 and the receiving apparatus 102 before transmitting image data (encoded data) will be described.

When the negotiation process starts, the communication unit 114 in the sending apparatus 101 sends, in step S201, dummy data (encoded data) at a predetermined bit rate R to the receiving apparatus 102 via the transmission line 103. In step S211, the communication unit 122 in the receiving apparatus 102 receives the dummy data. In step S212, the decoding unit 124 in the receiving apparatus 102 decodes the dummy data. In step S213, the communication unit 122 sends negotiation information including the result of decoding the dummy data and information regarding the receiving apparatus 102, such as the presence/absence of a decoder, resolution, bit rate, and delay time to the sending apparatus 101 via the transmission line 103.

When the communication unit 114 receives the negotiation information in step S202, the control unit 111 determines, in step S203, whether or not reception of the dummy data has failed (that is, whether or not decoding of the dummy data has failed). When it is determined that reception (decoding) has been successful, the control unit 111 advances the process to step S204 in which the setting of the bit rate R is incremented by AR, brings the process back to step S201, and causes the communication unit 114 to again send the dummy data at a new bit rate R.

The control unit 111 repeats the foregoing process and increases the bit rate R as long as the receiving apparatus successfully receives and decodes the dummy data. Then, when it is determined in step S203 on the basis of the negotiation information that the receiving apparatus 102 has failed receiving and decoding the dummy data, the control unit 111 advances the process to step S205, regards the previous bit rate R (the maximum value of the bit rate R at which the receiving apparatus 102 has successfully received and decoded the dummy data) as the final bit rate, and terminates the negotiation process.

Figure 20:
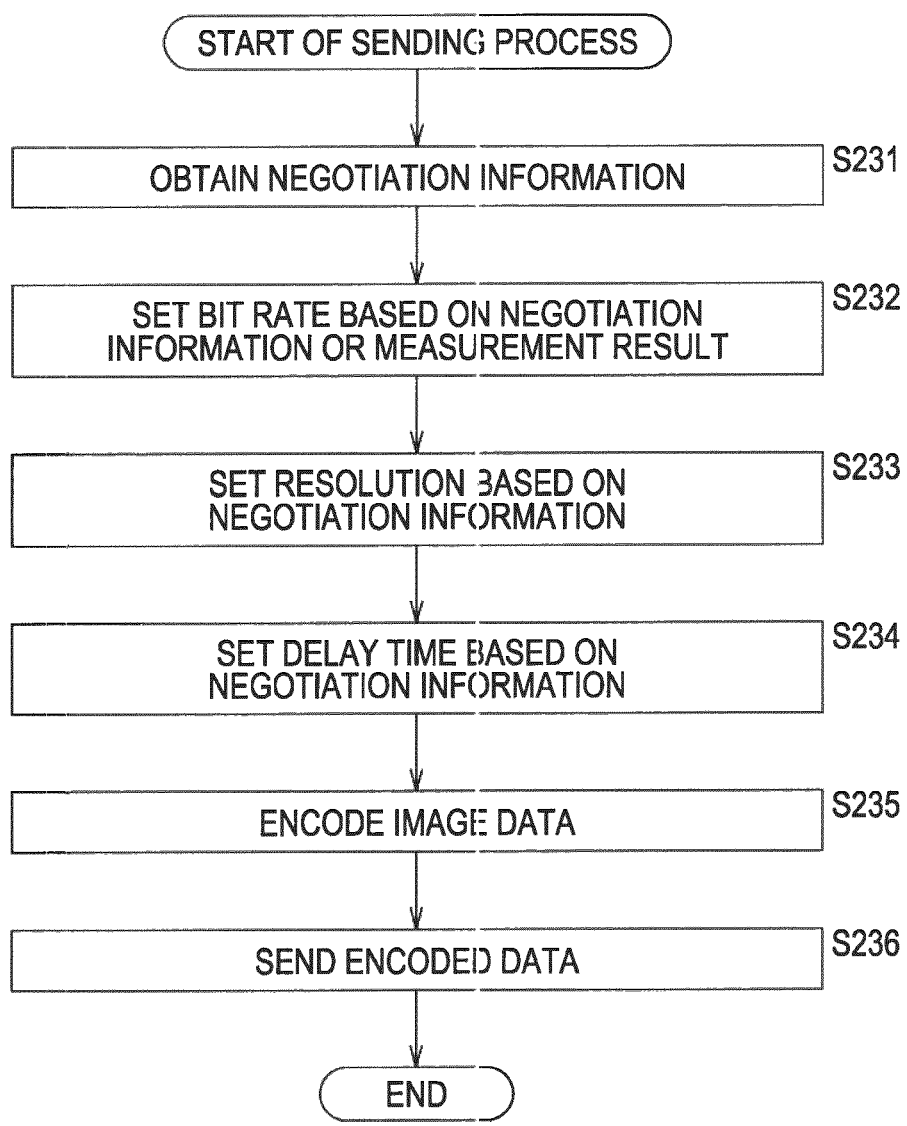
FIG. 20 is a flowchart for describing another exemplary flow of the sending process.

Next, with reference to the flowchart in FIG. 20, an exemplary flow of a sending process executed by the sending apparatus 101 after performing the foregoing negotiation process will be described. Note that the description here assumes that encoded data generated by encoding image data using the sending apparatus 101 is to be transmitted to the receiving apparatus 102. Needless to say, as has been described above, controlling whether or not to perform encoding may be combined with the following process.

When the sending process starts, in step S231, the control unit 111 obtains negotiation information from the communication unit 114. In step S232, the control unit 111 sets a target bit rate in an encoding process performed by the encoding unit 113 on the basis of information of the maximum bit rate at which the receiving apparatus 102 (decoding unit 124) can perform processing, which is included in the negotiation information, or the actual maximum bit rate which is the measurement result measured at the time of the above-described negotiation process. For example, the control unit 111 may preferentially set the actually measured maximum bit rate to the target bit rate. Alternatively, of the maximum bit rate at which the receiving apparatus 102 (decoding unit 124) can perform processing and the actual maximum bit rate, the control unit 111 may set one with a smaller value as the target bit rate.

In step S233, the control unit 111 sets the resolution in an encoding process performed by the encoding unit 113 on the basis of the negotiation information. Since encoded data is arranged in increments of a frequency component by performing an encoding process such as that described above, the encoding unit 113 can easily transmit encoded data with a desired resolution simply by extracting and transmitting a necessary portion in accordance with the setting of the resolution.

Further, in step S234, the control unit 111 sets the delay time in the encoding process performed by the encoding unit 113 on the basis of the negotiation information.

When various settings are completed, in step S235, the encoding unit 113 encodes image data on the basis of the above-described settings to generate encoded data according to the settings. The communication unit 114 sends this encoded data to the receiving apparatus 102 via the transmission line 103. When sending of the whole data is completed, the sending process is terminated.

By executing the negotiation process and the sending process as above, the transmission system 100 can transmit image data with high quality and low delay in more versatile situations.

Note that, when the format of image data to be transmitted is the YCbCr 4:2:0 format, the vertical-direction size of a chrominance component (C) is half that of a luminance component (Y). When the wavelet transform unit 151 in the encoding unit 113 performs wavelet transform as has been described above, the decomposition number becomes identical in the luminance component (Y) and the chrominance component (C).

Figure 21:
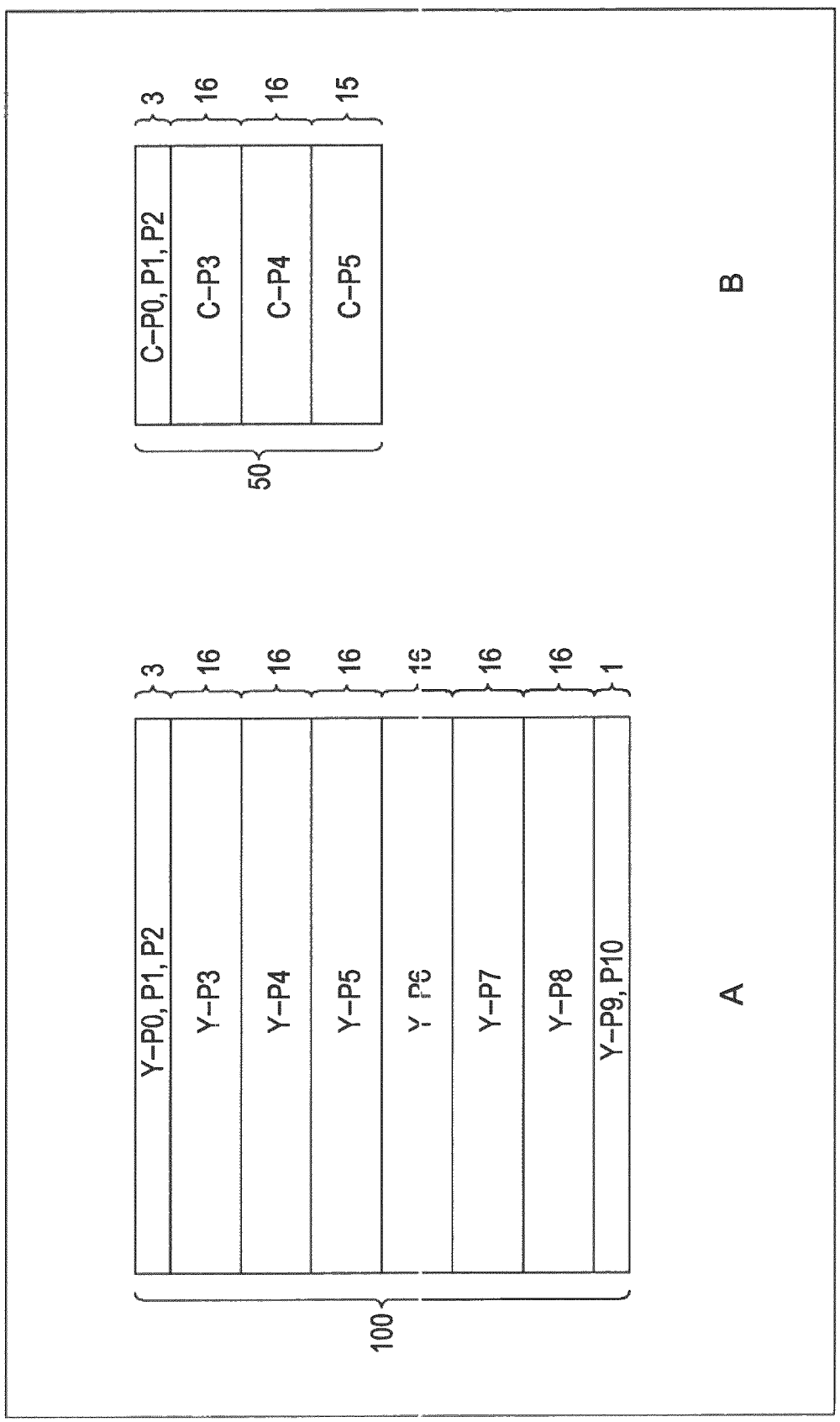
FIG. 21 includes schematic diagrams showing exemplary structures of precincts of a luminance component and a chrominance component.

At this time, as has been described above, since the vertical-direction size of the chrominance component (C) is half that of the luminance component (Y), for example, as shown in FIG. 21, the number of precincts of the chrominance component (C) may be different from the number of precincts of the luminance component (Y). A in FIG. 21 shows an exemplary structure of precincts of the luminance component (Y), and B in FIG. 21 shows an exemplary structure of precincts of the chrominance component (C). Y-P0 through Y-P10 in A in FIG. 21 individually show precincts of the luminance component (Y), and C-P0 through C-P5 in B in FIG. 21 individually show precincts of the chrominance component (C). Numerals on the left and right sides of A in FIG. 21 and B in FIG. 21 each indicate the number of lines.

In the example of A in FIG. 21, the number of precincts of the luminance component (Y) is "11". The number of precincts of the chrominance component (C) corresponding to this is "5", as shown in B in FIG. 21. That is, the positions of images corresponding to the same-numbered precincts of the luminance component (Y) and the chrominance component (C) may be different from each other. Accordingly, when the positions of images corresponding to the same-numbered precincts of the luminance component (Y) and the chrominance component (C) are different from each other, it may become difficult to control the rate with low delay on a precinct-by-precinct basis. In order to control the rate, it is necessary to determine which are the precincts at the same image position in the luminance component (Y) and the chrominance component (C).

Therefore, as has been described above, in the case where the format of image data to be transmitted is the YCbCr 4:2:0 format and the vertical-direction size of the chrominance component (C) is half that of the luminance component (Y), the encoding unit 113 (wavelet transform unit 151) may reduce the decomposition number in wavelet transform of the chrominance component (C) to be one less than the decomposition number of the luminance component (Y).

Figure 22:
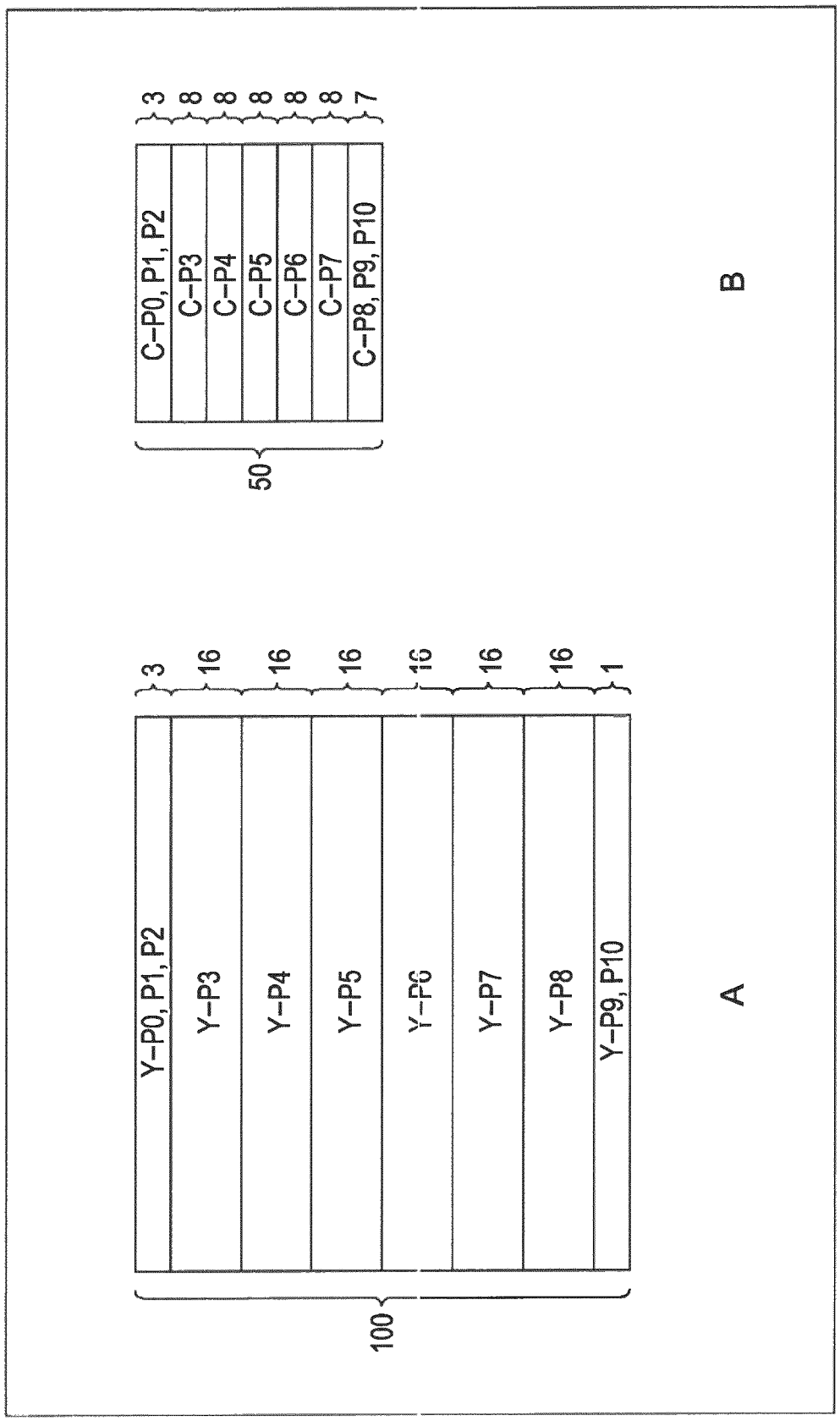
FIG. 22 includes schematic diagrams showing other exemplary structures of precincts of a luminance component and a chrominance component.

FIG. 22 includes schematic diagrams showing an exemplary structure of precincts of each component in the case where the decomposition number in wavelet transform of the chrominance component (C) is one less than the decomposition number of the luminance component (Y). A in FIG. 22 shows an exemplary structure of precincts of the luminance component (Y), and B in FIG. 22 shows an exemplary structure of precincts of the chrominance component (C). Y-P0 through Y-P10 in A in FIG. 22 individually show precincts of the luminance component (Y), and C-P0 through C-P10 in B in FIG. 22 individually show precincts of the chrominance component (C). Numerals on the left and right sides of A in FIG. 22 and B in FIG. 22 each indicate the number of lines.

As shown in FIG. 22, by performing wavelet transform in this manner, the number of lines of one precinct of the luminance component (Y) becomes 16 (excluding the top and bottom ends of the image). In contrast, the number of lines of one precinct of the chrominance component (C) becomes 8 (excluding the top and bottom ends of the image). Accordingly, the chrominance component (C) and the luminance component (Y) have substantially the same number of precincts. Accordingly, the positions of images corresponding to the same-numbered precincts of the luminance component (Y) and the chrominance component (C) substantially match each other, and hence, in each precinct, the difference in image between the luminance component (Y) and the chrominance component (C) becomes smaller than that in the case of FIG. 21. The encoding unit 113 can more easily perform rate control with low delay in increments of a precinct.

Figure 23:
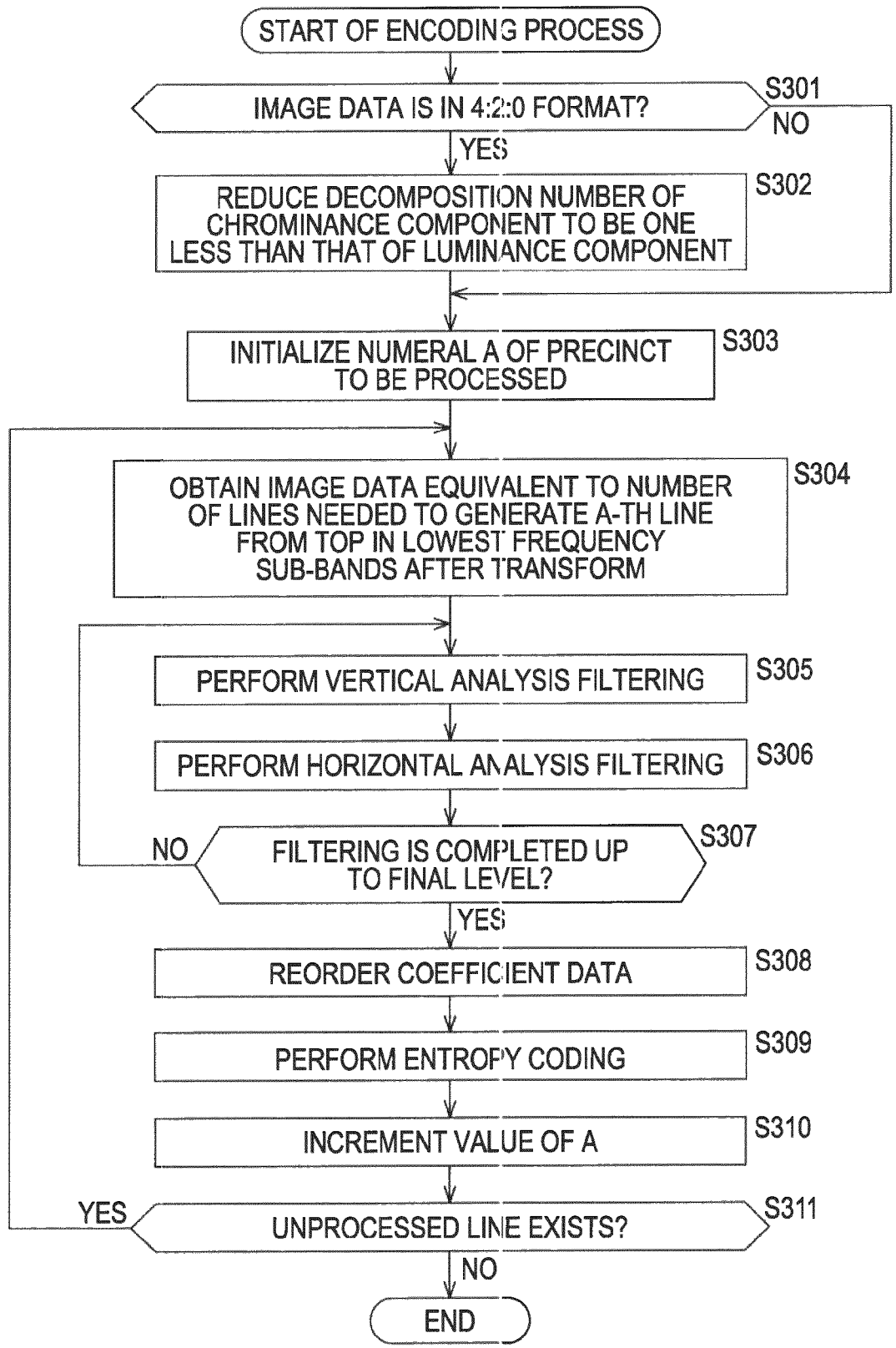
FIG. 23 is a flowchart for describing another exemplary flow of the encoding process.

An exemplary flow of an encoding process in such a case will be described with reference to the flowchart in FIG. 23.

When the encoding process starts, in step S301, the wavelet transform unit 151 in the encoding unit 113 determines whether or not the format of image data to be encoded is the 4:2:0 format. When it is determined that the format is the 4:2:0 format, the process proceeds to step S302, and the setting of the decomposition number of the chrominance component (C) is reduced to be one less than the setting of the decomposition number of the luminance component (Y). When the processing in step S302 ends, the wavelet transform unit 151 advances the process to step S303. Alternatively, when it is determined in step S301 that the format of image data to be encoded is not the 4:2:0 format, the wavelet transform unit 151 omits the processing in step S302 and advances the process to step S303.

Figure 9:
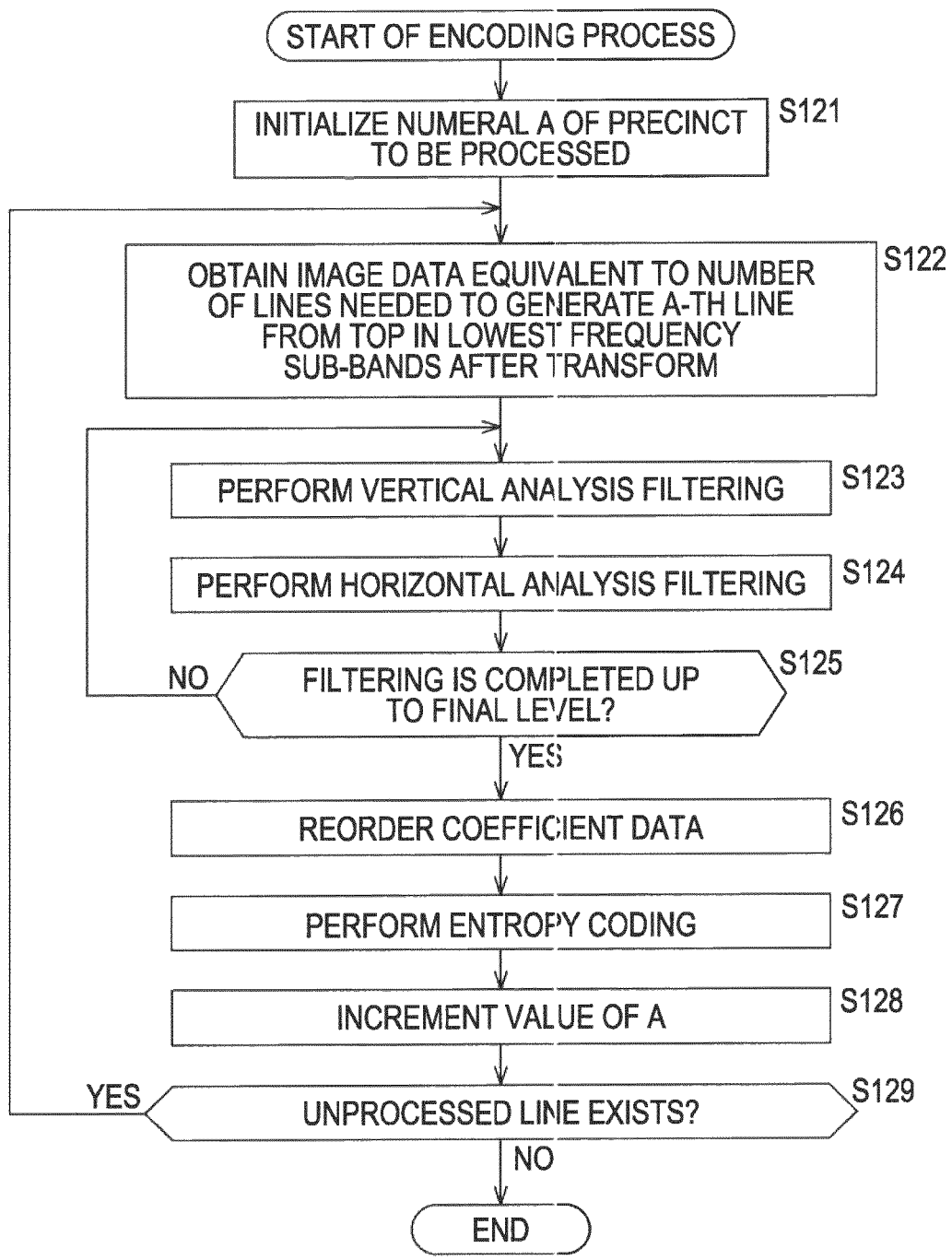
FIG. 9 is a flowchart for describing an exemplary flow of an encoding process.

The processing in step S303 through step S311 is executed similarly to the processing in respective step S121 through step S129 in FIG. 9. That is, the wavelet transform unit 151 performs basically similar processing on the luminance component (Y) and the chrominance component (C) except that the decomposition number is different.

As above, the encoding unit 113 can easily perform rate control even in the case where the format of image data to be encoded is the 4:2:0 format. Accordingly, the transmission system 100 can transmit image data with high quality and low delay in more versatile situations.

The above-described series of processes can be executed by hardware or can be executed by software. When the series of processes is to be executed by software, a program configuring the software is installed from a program recording medium into a computer embedded in dedicated hardware, a general personal computer, for example, which can execute various functions using various programs being installed therein, or an information processing apparatus in an information processing system consisting of a plurality of apparatuses.

Figure 24:
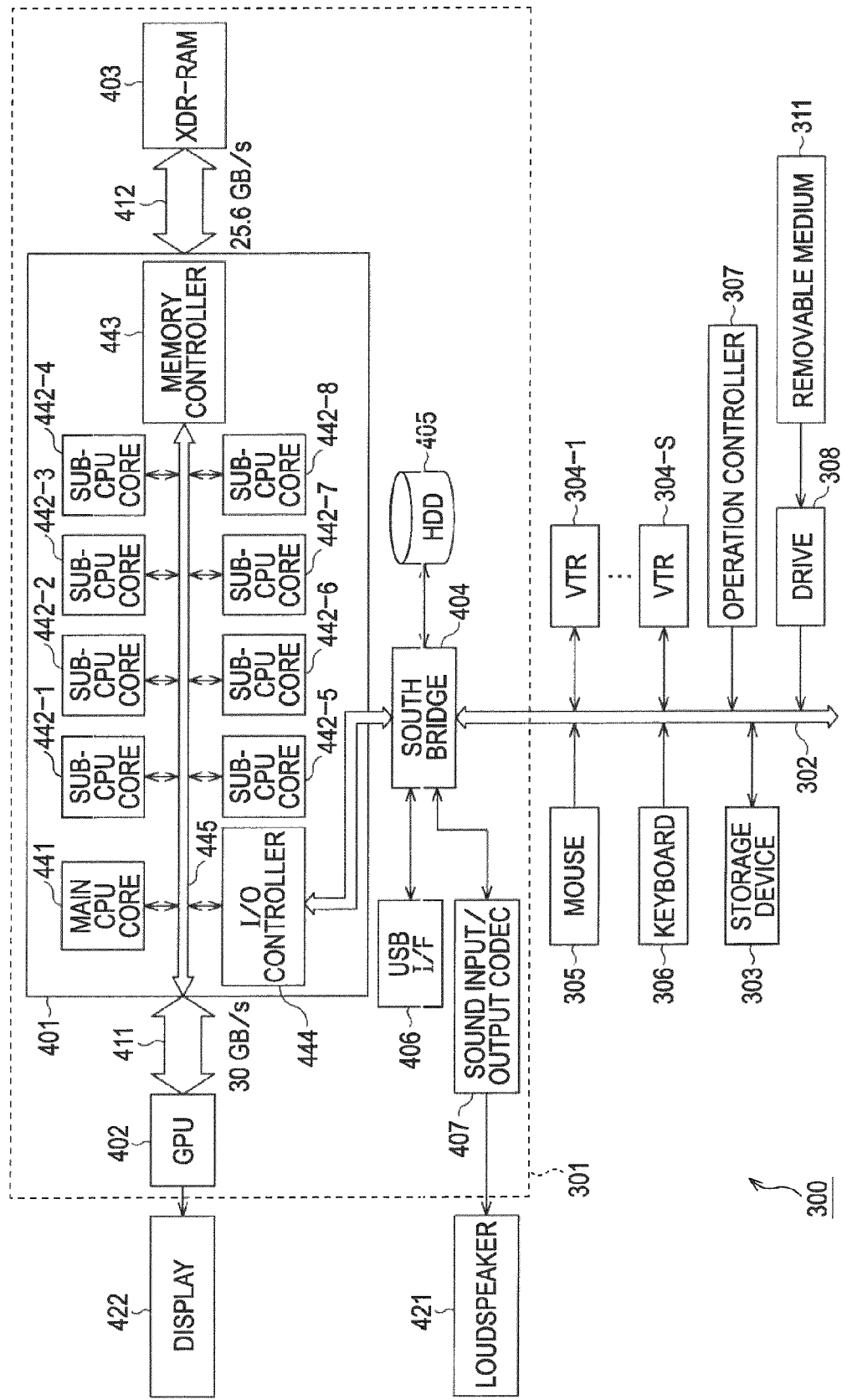
FIG. 24 is a diagram showing an exemplary configuration of an information processing system to which the present invention is applied.

FIG. 24 is a block diagram showing an exemplary configuration of an information processing system that executes the above-described series of processes based on a program.

As shown in FIG. 24, an information processing system 300 is a system configured with an information processing apparatus 301, a storage device 303 connected to the information processing apparatus 301 using a PCI bus 302, a VTR 304-1 through a VTR 304-S which are a plurality of video cassette recorders (VCR), and a mouse 305, keyboard 306, and operation controller 307 for a user to perform operation input to these, and is a system which performs an image encoding process, an image decoding process, and the like as described above based on an installed program.

For example, the information processing apparatus 301 in the information processing system 300 can store encoded data obtained by encoding moving image content stored in the large-capacity storage device 303 constituted of RAID (Redundant Arrays of Independent Disks) in the storage device 303, store in the storage device 303 decoded image data (moving image content) obtained by decoding the encoded data stored in the storage device 303, and store the encoded data and the decoded image data on video tapes via the VTR 304-1 through the VTR 304-S. Also, the information processing apparatus 301 is arranged to be capable of bringing in moving image content recorded on video tapes mounted in the VTR 304-1 through the VTR 304-S into the storage device 303. On that occasion, the information processing apparatus 301 may encode the moving image content.

The information processing apparatus 301 has a microprocessor 401, a GPU (Graphics Processing Unit) 402, an XDR (Extreme Data Rate)-RAM 403, a south bridge 404, an HDD (Hard Disk Drive) 405, a USB interface (USB I/F) 406, and a sound input/output codec 407.

The GPU 402 is connected to the microprocessor 401 via a dedicated bus 411. The XDR-RAM 403 is connected to the microprocessor 401 via a dedicated bus 412. The south bridge 404 is connected to an I/O controller 444 of the microprocessor 401 via a dedicated bus. Also connected to the south bridge 404 are the HDD 405, the USB interface 406, and the sound input/output codec 407. A loudspeaker 421 is connected to the sound input/output codec 407. Also, a display 422 is connected to the GPU 402.

Furthermore, also connected to the south bridge 404 are the mouse 305, the keyboard 306, the VTR 304-1 through the VTR 304-S, the storage device 303, and the operation controller 307, via the PCI bus 302.

The mouse 305 and the keyboard 306 receive operation inputs from the user and supply signals indicating the contents of the operation inputs from the user to the microprocessor 401 via the PCI bus 302 and the south bridge 404. The storage device 303 and the VTR 304-1 through the VTR 304-S are configured to be capable of recording or reproducing predetermined data.

Further connected to the PCI bus 302 according to need is a drive 308, to which a removable medium 311 such as a magnetic disk, an optical disk, a magneto-optical disk, or a semiconductor memory is suitably mounted, and a computer program read out therefrom is installed in the HDD 405 according to need.

The microprocessor 401 is configured with a multi-core configuration in which a general-purpose main CPU core 441 that executes basic programs such as an OS (Operating System), a sub-CPU core 442-1 through a sub-CPU core 442-8 which are a plurality of (eight in this case) RISC (Reduced Instruction Set Computer) type signal processing processors connected to the main CPU core 441 via an internal bus 445, a memory controller 443 that performs memory control of the XDR-RAM 403 having a capacity of 256 [MByte], for example, and the I/O (In/Out) controller 444 which manages input and output of data with the south bridge 404 are integrated on one chip, and realizes an operation frequency of 4 [GHz], for example.

At the time of activation, the microprocessor 401 reads out necessary application programs stored in the HDD 405 on the basis of a control program stored in the HDD 405, expands the application programs in the XDR-RAM 403, and subsequently executes necessary control processes based on the application programs and operator operations.

Also, by executing the software, the microprocessor 401 can, for example, realize the above-described encoding process and decoding process, supply encoded streams obtained as a result of encoding via the south bridge 404 to the HDD 405 for storage, and perform data transfer of a video image reproduced from the moving image content obtained as a result of decoding to the GPU 402 for display on the display 422.

While a method of using each CPU core in the microprocessor 401 is arbitrary, for example, the main CPU core 441 may perform processing relating to control of an image encoding process and an image decoding process, and may control the eight sub-CPU core 442-1 through sub-CPU core 442-8 to perform processes, such as wavelet transform, coefficient reordering, entropy coding, entropy decoding, inverse wavelet transform, quantization, and dequantization, simultaneously in parallel as described with reference to FIG. 11, for example. On that occasion, when the main CPU core 441 is arranged to assign processing to each of the eight sub-CPU core 442-1 through sub-CPU core 442-8 on a precinct-by-precinct basis, an encoding process and a decoding process are executed simultaneously in parallel on a precinct-by-precinct basis, as has been described above. That is, the efficiency of an encoding process and a decoding process can be improved, the delay time of the overall processing can be reduced, and further, the load, processing time, and memory capacity necessary for the processing can be reduced. Needless to say, each process can be performed using other methods, as well.

For example, some of the eight sub-CPU core 442-1 through sub-CPU core 442-8 of the microprocessor 401 can be arranged to execute an encoding process and the rest can be arranged to perform a decoding process simultaneously in parallel.

Also, for example, when an independent encoder or decoder, or codec processing apparatus is connected to the PCI bus 302, the eight sub-CPU core 442-1 through sub-CPU core 442-8 of the microprocessor 401 may be arranged to control processes executed by these apparatuses via the south bridge 404 and the PCI bus 302. Further, when a plurality of such apparatuses are connected, or when these apparatuses include a plurality of decoders or encoders, the eight sub-CPU core 442-1 through sub-CPU core 442-8 of the microprocessor 401 may be arranged to control processes executed by the plurality of decoders or encoders in a sharing manner.

At this time, the main CPU core 441 manages the operation of the eight sub-CPU core 442-1 through sub-CPU core 442-8, assigns processes to the individual sub-CPU cores, and retrieves processing results. Further, the main CPU core 441 performs processes other than those performed by these sub-CPU cores. For example, the main CPU core 441 accepts commands supplied from the mouse 305, the keyboard 306, or the operation controller 307 via the south bridge 404 and executes various processes in response to the commands.

The GPU 402 governs functions for performing, in addition to a final rendering process regarding, for example, pasting textures when moving a video image reproduced from moving image content to be displayed on the display 422, a coordinate transformation calculation process when simultaneously displaying a plurality of video images reproduced from moving image content and still images of still image content on the display 422, an enlargement/reduction process of a video image reproduced from moving image content and a still image of still image content, and so forth, thereby alleviating the processing load on the microprocessor 401.

Under control of the microprocessor 401, the GPU 402 applies predetermined signal processing to video image data of supplied moving image content and image data of still image content, sends the video image data and image data obtained as a result thereof to the display 422, and displays image signals on the display 422.

For example, video images reproduced from a plurality of items of moving image content decoded simultaneously in parallel by the eight sub-CPU core 442-1 through sub-CPU core 442-8 of the microprocessor 401 are data-transferred to the GPU 402 via the bus 411. The transfer speed on this occasion is, for example, 30 [Gbyte/sec] at maximum, and accordingly, even complex reproduced video images with special effects can be displayed quickly and smoothly.

In addition, the microprocessor 401 applies audio mixing processing to audio data, of video image data and audio data of moving image content, and sends edited audio data obtained as a result thereof to the loudspeaker 421 via the south bridge 404 and the sound input/output codec 407, thereby outputting audio based on audio signals from the loudspeaker 421.

When the above-described series of processes is to be executed by software, a program configuring the software is installed from a network or a recording medium.

This recording medium is configured with, for example, as shown in FIG. 24, not only the removable medium 311 which has recorded thereon the program and is distributed, separately from a main body of the apparatus, to distribute the program to a user, such as a magnetic disk (including a flexible disk), an optical disk (including CD-ROM and DVD), a magneto-optical disk (including MD) or a semiconductor memory, but also the HDD 405, the storage device 303, and the like, which have recorded thereon the program and are distributed to the user in a state where they are embedded in advance in the main body of the apparatus. Needless to say, the recording medium may also be a semiconductor memory, such as a ROM or a flash memory.

In the above, it has been described that the eight sub-CPU cores are configured in the microprocessor 401. However, the present invention is not limited thereto. The number of sub-CPU cores is arbitrary. Also, the microprocessor 401 is not necessarily be configured with a plurality of cores such as a main CPU core and sub-CPU cores, and the microprocessor 401 may be configured using a CPU configured with a single core (one core). Also, instead of the microprocessor 401, a plurality of CPUs may be used, or a plurality of information processing apparatuses may be used (that is, a program that executes the processes of the present invention is executed in a plurality of apparatuses operating in conjunction with one another).

The steps describing the program recorded in the recording medium in the present specification may of course include processes performed time sequentially in accordance with the described order, but also include processes executed not necessarily time sequentially but in parallel or individually.

Also, the system in the present specification refers to the entirety of equipment constituted of a plurality of devices (apparatuses).

Note that a structure described above as being a single apparatus may be split so as to be configured as a plurality of apparatuses. Conversely, structures described above as being a plurality of apparatuses may be consolidated so as to be configured as a single apparatus. Also, needless to say, the structures of the individual apparatuses may have added thereto structures other than those described above. Further, a part of the structure of one apparatus may be included in the structure of another apparatus, as long as the structure and operation of the overall system are substantially the same.

Industrial Applicability

The present invention described above is to perform data transmission with high quality and low delay in more versatile situations and is applicable to various apparatuses or systems as long as they compress, encode, and transmit images and, at a transmission destination, decode the compressed encoding and output the images. The present invention is particularly suitable to apparatuses or systems required to have a short delay from image compression and encoding to decoding and outputting.

For example, the present invention is suitable for use in applications of the medical remote medical analysis, such as operating a master-slave manipulator while looking at a video image captured by a video camera and performing a medical treatment. Also, the present invention is suitable for use in systems that encode and transmit images and decode and display or record the images in broadcasting stations and the like.

Additionally, the present invention can be applied to systems that perform distribution of live coverage of video images, systems that enable interactive communication between students and teachers in educational institutions, and the like.

Furthermore, the present invention can be applied to sending of image data captured by a mobile terminal having an image capturing function, such as a mobile phone terminal with a camera function, video conference systems, systems including a monitoring camera and a recorder that records a video image captured by the monitoring camera, and the like.

The invention claimed is:

1. An information processing apparatus comprising:
a processor including
a selecting unit configured to select whether or not to encode image data to be transmitted based on whether a transmission-allowed bit rate of the transmission line is greater than a bit rate of the image data;
a filtering unit configured to perform, when encoding of the image data is selected, a process of decomposing the image data in increments of a frequency band and to generate sub-bands including coefficient data in increments of the frequency band, in increments of a line block including image data equivalent to a number of lines needed to generate coefficient data equivalent to one line of sub-bands of at least lowest frequency components;
a reordering unit configured to reorder the coefficient data, which has been generated by the filtering unit in order from high frequency components to low frequency components, in order from low frequency components to high frequency components;
an encoding configured to encode the coefficient data reordered by the reordering unit; and
a sending unit configured to send encoded data generated by encoding the coefficient data using the encoding unit to another information processing apparatus via a transmission line.

2. The information processing apparatus according to claim 1, wherein to the processor further includes:
an obtaining unit configured to obtain, from the other information processing apparatus, information regarding performance of the other information processing apparatus.

3. The information processing apparatus according to claim 2,
wherein the sending unit sends predetermined encoded data to the other information processing apparatus,
wherein the obtaining unit obtains information indicating a result of reception and decoding of the encoded data in the other information processing apparatus, and
wherein the selecting unit selects whether or not to encode the image data based on the information indicating the result of reception and decoding of the encoded data, which has been obtained by the obtaining unit.

4. The information processing apparatus according to claim 2,
wherein the obtaining unit obtains information of a delay time in a decoding process of the other information processing apparatus, and
wherein the encoding unit sets a delay time in an encoding process based on the information of the delay time, which has been obtained by the obtaining unit.

5. The information processing apparatus according to claim 2,
wherein the obtaining unit obtains information of a resolution of the image data in the other information processing apparatus, and
wherein the encoding unit sets a resolution of encoded data to be generated based on the information of the resolution, which has been obtained by the obtaining unit.

6. The information processing apparatus according to claim 1,
wherein, in a case where a format of the image data to be encoded is 4:2:0, the filtering unit reduces a decomposition number of a chrominance component of the image data to be one less than a decomposition number of a luminance component of the image data.

7. The information processing apparatus according to claim 1, wherein the selecting unit selects to encode the image data when the transmission-allowed bit rate of the transmission line is lower than the bit rate of the image data.

8. The information processing apparatus according to claim 1, wherein the selecting unit selects to not encode the image data when the transmission-allowed bit rate of the transmission line is higher than the bit rate of the image data.

9. An method for causing an information processing apparatus to process image date, the method comprising:
selecting, in a selecting unit, whether or not to encode image data based on whether a transmission-allowed bit rate of the transmission line is greater than a bit rate of the image data;
decomposing, in a filtering unit and when encoding of the image data is selected, the image data in increments of a frequency band and generating sub-bands including coefficient data in increments of the frequency band, in increments of a line block including image data equivalent to a number of lines needed to generate coefficient data equivalent to one line of sub-bands of at least lowest frequency components;
reordering, in a reordering unit, the coefficient data in order from low frequency components to high frequency components;
encoding, in an encoding unit, the coefficient data after reordering; and
sending, from a sending unit, encoded data corresponding to the coefficient data after encoding to another information processing apparatus via a transmission line.

* * * * *